(12) United States Patent
Xia et al.

(10) Patent No.: US 10,857,766 B2
(45) Date of Patent: Dec. 8, 2020

(54) DEGRADABLE EVOH HIGH-BARRIER COMPOSITE FILM

(71) Applicant: KUNSHAN ZHANGPU COLOR PRINTING FACTORY, Jiangsu (CN)

(72) Inventors: Jialiang Xia, Jiangsu (CN); Xuewen Gao, Jiangsu (CN); Yu Xia, Jiangsu (CN); Minyan Tang, Jiangsu (CN); Xiaoqin Yu, Jiangsu (CN)

(*) Notice: Subject to any disclaimer, the term of this patent is extended or adjusted under 35 U.S.C. 154(b) by 78 days.

(21) Appl. No.: 15/519,532

(22) PCT Filed: Apr. 16, 2015

(86) PCT No.: PCT/CN2015/076816
§ 371 (c)(1),
(2) Date: Apr. 14, 2017

(87) PCT Pub. No.: WO2016/090805
PCT Pub. Date: Jun. 16, 2016

(65) Prior Publication Data
US 2017/0334174 A1 Nov. 23, 2017

(30) Foreign Application Priority Data
Dec. 11, 2014 (CN) .......................... 2014 1 0753620

(51) Int. Cl.
*B32B 27/08* (2006.01)
*B32B 27/18* (2006.01)
(Continued)

(52) U.S. Cl.
CPC ............. *B32B 27/08* (2013.01); *B32B 7/12* (2013.01); *B32B 27/18* (2013.01); *B32B 27/30* (2013.01); *B32B 27/306* (2013.01); *B32B 27/32* (2013.01); *B32B 27/36* (2013.01); *C08F 10/02* (2013.01); *C08F 16/06* (2013.01); *C08F 22/06* (2013.01); *C08F 255/02* (2013.01); *B32B 7/02* (2013.01); *B32B 7/04* (2013.01); *B32B 27/308* (2013.01); *B32B 2250/05* (2013.01); *B32B 2250/24* (2013.01); *B32B 2307/30* (2013.01); *B32B 2307/31* (2013.01); *B32B 2307/7163* (2013.01); *B32B 2307/72* (2013.01); *B32B 2307/7242* (2013.01); *B32B 2307/7244* (2013.01); *B32B 2323/04* (2013.01); *B32B 2323/046* (2013.01); *B32B 2323/10* (2013.01); *B32B 2367/00* (2013.01); *C08L 23/06* (2013.01); *C08L 23/08* (2013.01); *C08L 23/0807* (2013.01); *C08L 23/0823* (2013.01); *C08L 23/0838* (2013.01); *C08L 23/0846* (2013.01); *C08L 23/0861* (2013.01); *C08L 23/0869* (2013.01); *C08L 23/10* (2013.01); *C08L 23/12* (2013.01); *C08L 23/14* (2013.01); *C08L 23/147* (2013.01); *C08L 67/02* (2013.01); *C08L 67/03* (2013.01); *C08L 2201/14* (2013.01); *C08L 2203/16* (2013.01);

*C08L 2203/162* (2013.01); *C08L 2205/02* (2013.01); *C08L 2207/066* (2013.01); *C09J 123/06* (2013.01); *C09J 123/08* (2013.01);
(Continued)

(58) Field of Classification Search
None
See application file for complete search history.

(56) References Cited

U.S. PATENT DOCUMENTS 4,016,117 A * 4/1977 Griffin ...................... C08L 3/00
260/DIG. 43
4,198,327 A * 4/1980 Matsumoto ............ C09J 151/06
525/73
(Continued)

FOREIGN PATENT DOCUMENTS

| CN | 102391626 A | * | 3/2012 |
| CN | 102627013 A | * | 8/2012 |
| CN | 104059342 A | * | 9/2014 |
| CN | 104369508 A | * | 2/2015 |
| CN | 104369509 A | * | 2/2015 |

(Continued)

OTHER PUBLICATIONS

"Wikipedia—List of Composting Systems" (https://en.wikipedia.org/wiki/List_of_composting_systems) (webpage retrieved May 11, 2019) (Year: 2019).*

(Continued)

*Primary Examiner* — Vivian Chen
(74) *Attorney, Agent, or Firm* — Ian Burns; ATIP Law

(57) ABSTRACT

A degradable EVOH high-barrier composite film, characterized in that the materials of various layers in the composite film all obtain approximately-consistent biodegradability by introducing biomass, and the additive amount of the additive master batch in the materials of each layer is controlled within the range of 0.3-15% of the total mass of the materials of the corresponding layer; the hydrophilic activity of the hydrophilic groups in the additive master batch should be greater than or equal to that of the hydrophilic groups in the materials of each layer; by adding the additive master batch, the mole ratios of the hydrophilic groups to carbon atoms of the materials of various layers tend to be consistent, namely, the bioactivities tend to be consistent, so that the degradation rates of the materials of various layers in the composite film tend to be consistent. The present invention makes contribution to obtaining approximately-consistent bioactivities and approximately-consistent biodegradation rates by balancing the mole ratios of the hydrophilic groups to carbon atoms in the materials of various layers, and the appearance, the functions and the physical and mechanical properties of a product remain unchanged.

9 Claims, No Drawings

(51) Int. Cl.

| | | |
|---|---|---|
| *B32B 27/30* | (2006.01) | |
| *B32B 27/32* | (2006.01) | |
| *B32B 27/36* | (2006.01) | |
| *B32B 7/12* | (2006.01) | |
| *C08F 10/02* | (2006.01) | |
| *C08F 16/06* | (2006.01) | |
| *C08F 22/06* | (2006.01) | |
| *C08F 255/02* | (2006.01) | |
| *B32B 7/02* | (2019.01) | |
| *B32B 7/04* | (2019.01) | |
| *C08L 67/03* | (2006.01) | |
| *C08L 23/10* | (2006.01) | |
| *C08L 23/08* | (2006.01) | |
| *C08L 23/14* | (2006.01) | |
| *C08L 23/12* | (2006.01) | |
| *C08L 23/06* | (2006.01) | |
| *C08L 67/02* | (2006.01) | |
| *C09J 123/08* | (2006.01) | |
| *C09J 123/14* | (2006.01) | |
| *C09J 123/12* | (2006.01) | |
| *C09J 123/06* | (2006.01) | |
| *C09J 123/10* | (2006.01) | |

(52) U.S. Cl.
CPC .... *C09J 123/0807* (2013.01); *C09J 123/0823* (2013.01); *C09J 123/0838* (2013.01); *C09J 123/0846* (2013.01); *C09J 123/0861* (2013.01); *C09J 123/0869* (2013.01); *C09J 123/10* (2013.01); *C09J 123/12* (2013.01); *C09J 123/14* (2013.01); *C09J 123/147* (2013.01); *C09J 2423/04* (2013.01); *C09J 2423/041* (2013.01); *C09J 2423/046* (2013.01); *C09J 2423/10* (2013.01); *C09J 2423/106* (2013.01); *C09J 2467/00* (2013.01); *C09J 2467/006* (2013.01); *Y10T 428/24942* (2015.01); *Y10T 428/2813* (2015.01); *Y10T 428/2817* (2015.01); *Y10T 428/2826* (2015.01); *Y10T 428/2878* (2015.01); *Y10T 428/31786* (2015.04); *Y10T 428/31794* (2015.04); *Y10T 428/31909* (2015.04); *Y10T 428/31913* (2015.04); *Y10T 428/31928* (2015.04); *Y10T 428/31935* (2015.04); *Y10T 428/31938* (2015.04)

(56) References Cited

U.S. PATENT DOCUMENTS

| | | | | | |
|---|---|---|---|---|---|
| 4,751,270 | A * | 6/1988 | Urawa | C08F 255/02 | 525/244 |
| 4,963,664 | A * | 10/1990 | Yalpani | C07K 17/12 | 530/350 |
| 5,087,650 | A * | 2/1992 | Willett | C08L 3/02 | 524/47 |
| 5,091,262 | A * | 2/1992 | Knott | B32B 27/18 | 428/516 |
| 5,095,054 | A * | 3/1992 | Lay | A01N 25/10 | 264/328.14 |
| 5,108,807 | A * | 4/1992 | Tucker | B32B 27/08 | 428/35.2 |
| 5,158,810 | A * | 10/1992 | Oishi | B32B 27/30 | 428/35.4 |
| 5,180,788 | A * | 1/1993 | Vroomans | C08F 255/02 | 428/476.1 |
| 5,216,050 | A * | 6/1993 | Sinclair | A61L 15/26 | 524/108 |
| 5,219,646 | A * | 6/1993 | Gallagher | A61L 15/225 | 428/481 |
| 5,317,037 | A * | 5/1994 | Golden | A63B 57/10 | 523/128 |
| 5,354,621 | A * | 10/1994 | Liebermann | B27N 3/00 | 428/532 |
| 5,446,078 | A * | 8/1995 | Vaidya | C08B 31/00 | 523/124 |
| 5,470,526 | A * | 11/1995 | Wilfong | C08K 5/0033 | 264/178 R |
| 5,523,293 | A * | 6/1996 | Jane | A23J 3/04 | 106/126.1 |
| 5,789,570 | A * | 8/1998 | Buchholz | A61L 15/28 | 536/107 |
| 5,854,304 | A * | 12/1998 | Garcia | C08K 5/098 | 523/124 |
| 5,931,488 | A * | 8/1999 | Graziano | A47B 13/00 | 108/127 |
| 6,103,885 | A * | 8/2000 | Batelaan | C08B 11/14 | 536/18.7 |
| 6,294,632 | B1 * | 9/2001 | Shiraishi | B29C 55/12 | 526/348.1 |
| 6,313,105 | B1 * | 11/2001 | Bengs | C08K 5/0016 | 514/60 |
| 7,550,533 | B2 * | 6/2009 | Leboeuf | B32B 27/08 | 525/70 |
| 2001/0055794 | A1 * | 12/2001 | Kierulff | C08B 15/04 | 435/101 |
| 2002/0094444 | A1 * | 7/2002 | Nakata | B32B 27/36 | 428/480 |
| 2003/0088089 | A1 * | 5/2003 | Gnad | C08B 31/18 | 536/105 |
| 2003/0100635 | A1 * | 5/2003 | Ho | A24D 3/068 | 524/47 |
| 2003/0119949 | A1 * | 6/2003 | Favis | C08J 3/005 | 524/47 |
| 2004/0116569 | A1 * | 6/2004 | Ward | C08F 8/12 | 524/366 |
| 2005/0136271 | A1 * | 6/2005 | Germroth | C08J 5/18 | 428/480 |
| 2005/0154114 | A1 * | 7/2005 | Hale | C08J 5/18 | 524/436 |
| 2005/0154147 | A1 * | 7/2005 | Germroth | C08K 5/0016 | 525/437 |
| 2007/0231554 | A1 * | 10/2007 | Bastioli | A01K 15/026 | 428/219 |
| 2008/0064812 | A1 * | 3/2008 | Narayan | C08J 3/226 | 524/599 |
| 2008/0103232 | A1 * | 5/2008 | Lake | C08K 5/09 | 523/124 |
| 2008/0163978 | A1 * | 7/2008 | Botros | B32B 7/12 | 156/313 |
| 2009/0096703 | A1 * | 4/2009 | Chase | B32B 27/10 | 343/841 |
| 2009/0156713 | A1 * | 6/2009 | Ding | C08B 31/003 | 523/351 |
| 2009/0163620 | A1 * | 6/2009 | Sumanam | C08L 89/00 | 523/351 |
| 2009/0274920 | A1 * | 11/2009 | Li | B32B 1/02 | 428/481 |
| 2009/0312456 | A1 * | 12/2009 | Changping | C08J 3/226 | 523/128 |
| 2010/0080943 | A1 * | 4/2010 | Uradnisheck | C08K 5/098 | 428/36.91 |
| 2010/0098935 | A1 * | 4/2010 | McGee | B32B 7/12 | 428/319.3 |
| 2010/0136324 | A1 * | 6/2010 | Ohno | B29B 7/484 | 428/326 |
| 2010/0216909 | A1 * | 8/2010 | Berg Gebert | C08L 67/04 | 523/128 |
| 2012/0016328 | A1 * | 1/2012 | Shi | A61F 13/15252 | 604/385.01 |
| 2012/0288693 | A1 * | 11/2012 | Stanley | B32B 7/12 | 428/213 |
| 2013/0011906 | A1 * | 1/2013 | Lake | C08K 5/09 | 435/252.8 |
| 2013/0046262 | A1 * | 2/2013 | Wang | C08J 5/18 | 604/370 |

(56) References Cited

U.S. PATENT DOCUMENTS

| | | | | |
|---|---|---|---|---|
| 2013/0101774 | A1* | 4/2013 | MacLeod | C08L 23/06 428/36.92 |
| 2013/0109781 | A1* | 5/2013 | Lake | C08K 5/09 523/124 |
| 2013/0184415 | A1* | 7/2013 | Yoshikawa | C08K 3/26 525/450 |
| 2013/0274373 | A1* | 10/2013 | Yoshikawa | C08G 63/08 523/124 |
| 2013/0309426 | A1* | 11/2013 | Thai | C09J 7/29 428/35.2 |
| 2014/0099455 | A1* | 4/2014 | Stanley | B32B 7/12 428/34.3 |
| 2014/0303285 | A1* | 10/2014 | Hou | C08L 101/16 523/451 |
| 2014/0303291 | A1* | 10/2014 | Ichikawa | C08L 3/02 524/47 |
| 2015/0148531 | A1* | 5/2015 | Mikkonen | C08B 15/04 536/63 |
| 2015/0328373 | A1* | 11/2015 | Pacetti | A61L 31/06 427/2.3 |
| 2017/0198137 | A1* | 7/2017 | Blanchard | C08K 3/22 |

FOREIGN PATENT DOCUMENTS

| | | | |
|---|---|---|---|
| CN | 104385698 A | * | 3/2015 |
| CN | 104494260 A | * | 4/2015 |
| KR | 20080033620 A | * | 4/2008 |

OTHER PUBLICATIONS

"Wikipedia—Aerated Static Pile Composting" (https://en.wikipedia.org/wiki/Aerated_static_pile_composting) (webpage retrieved May 11, 2019) (Year: 2019).*

"Wikipedia —Windrow Composting" (https://en.wikipedia.org/wiki/Windrow_composting) (webpage retrieved May 11, 2019) (Year: 2019 ).*

"Large-Scale Organic Materials Composting" North Carolina State University—NC Cooperative Extension (1999) (Year: 1999).*

"Large-Scale Composting" (http://www.fao.org/3/y5104e/y5104e07.htm) (undated).*

"Polyethylene Terephthalate—Wikipedia" ("https://en.wikipedia.org/wiki/Polyethylene_terephthalate") webpage retrieved Jan. 8, 2020. (Year: 2020).*

KR 1020080033620 A (Yoo et al) (published Apr. 17, 2008) (Year: 2008).*

* cited by examiner

DEGRADABLE EVOH HIGH-BARRIER COMPOSITE FILM

TECHNICAL FIELD

The present invention relates to the technical field of a multi-layer composite film, in particular to a biodegradable EVOH high-barrier composite film.

BACKGROUND

A multi-layer co-extrusion composite film is a film formed by compositing multiple different polymers through adopting a co-extrusion blow molding method, a co-extrusion tape casting method or a co-extrusion drawing method. Such film as a plastic packaging material is widely applied to food, processing of meat products, daily supplies, cosmetics, chemical products, pesticides, military products, etc., can realize sealing soft packaging of products and meet various packaging functions of inflating or vacuumizing, hot molding, etc., and has various barrier performances such as a high resistance to humidity, oxygen and oil and retention of aroma under various environments.

Along with the use of massive composite films in respective fields, pollution of the composite film to environment is aggravated day by day. Since it is hard to degrade, along with the daily increase of a use level, the pollution caused by the composite film has become a worldwide public hazard. At present, some traditional methods such as incineration, burying and recycle for disposing the composite film waste have defects and certain limitation that brings about a serious load to environment. Therefore, development of a biodegradable composite film capable of reducing environmental pollution is important means of solving the environmental pollution.

As far as the applicant knows, there is still a blank in a biodegradation technique and an application technology about the composite film having same degradation rates, and no relevant reports appear at home and abroad. But in view of the status quo of a market demand quickly increased and protection of ecological balance, it is urgent to research a multi-layer co-extrusion composite film with biodegradability, wherein how to cause degradation rates of the materials of various layers in the multi-layer co-extrusion composite film tend to be consistent in a biodegradation process without losing original mechanical properties and shield life is an important research project with practical significance.

SUMMARY OF THE INVENTION

An object of the present invention is to provide a degradable EVOH high-barrier composite film with biodegradation rates that tend to be consistent.

In order to realize the above object, a first technical solution adopted by the present invention is a degradable EVOH high-barrier composite film, such composite film has a structure as follows:

PET/EAA-TIE/EVOH/PE-TIE/PE      Formula (1)

in formula (1), the meanings in a sequence from left to right are as follows:
PET is an outer layer which has a function of a protective layer or presentation layer, a material of the PET is polyester, and a hydrophilic group that the polyester contains is ester group;
EAA-TIE is a first adhesive layer, a material of the EAA-TIE is maleic anhydride-grafted ethylene acrylic copolymer, and hydrophilic groups that the maleic anhydride-grafted ethylene acrylic copolymer contains are carboxyl and anhydride;
EVOH is an intermediate layer which has a function of a barrier layer, a material of the EVOH is EVOH indicating ethylene-vinyl alcohol copolymer, and a hydrophilic group that the ethylene-vinyl alcohol copolymer contains is hydroxyl;
PE-TIE is a second adhesive layer, a material of the PE-TIE is maleic anhydride-grafted polyethylene copolymer, and a hydrophilic group that the maleic anhydride-grafted polyethylene copolymer contains is anhydride;
PE is an inner layer which has a function of a heat sealing layer, and a material of the PE is polyethylene without containing a hydrophilic group;
the innovation is in that the materials of various layers in the composite film all obtain approximately-consistent biodegradability by being introduced a biomass, the biomass is a type of additive master batch having biodegradable activity under a condition of a refuse disposal plant or composting, the additive master batch is uniformly added into the materials of various layers in proportion, and then the composite film is prepared through a melting co-extrusion method;
the additive master batch consists of a carrier and an active agent, the active agent is a polymer containing a hydrophilic group, wherein an effective component of the active agent is the hydrophilic group, and the hydrophilic group is at least one of carboxylate, carboxyl, hydroxyl, aldehyde group, acylamino, anhydride and ester group;
in the materials of various layers and additive master batch in formula (1), the hydrophilic groups are arrayed in a sequence of carboxylate, carboxyl, hydroxyl, aldehyde group, acylamino, anhydride and ester group according to the hydrophilic activity from high to low;
the carriers are selected according to the principle of similarity and intermiscibility specific to the materials of various layers: for the polyester material of the outer layer, the carrier in the additive master batch is polyester;
for the maleic anhydride-grafted ethylene acrylic copolymer material of the first adhesive layer, the carrier in the additive master batch is ethylene acrylic copolymer;
for the ethylene-vinyl alcohol copolymer material of the intermediate layer, the carrier in the additive master batch is polyethylene;
for the maleic anhydride-grafted polyethylene copolymer material of the second adhesive layer, the carrier in the additive master batch is polyethylene;
for the polyethylene material of the inner layer, the carrier in the additive master batch is polyethylene;
the additive amount of the additive master batch in the materials of each layer is controlled within the range of 0.3-15% of the total mass of the materials of the corresponding layer; the hydrophilic activity of the hydrophilic groups in the additive master batch should be greater than or equal to that of the hydrophilic groups in the materials of each layer in formula (1); by adding the additive master batch, the mole ratios of the hydrophilic groups to carbon atoms of the materials of various layers in formula (1) tend to be consistent, namely, the bioactivities tend to be consistent, so that the degradation rates of the materials of various layers in the composite film tend to be consistent.

In order to achieve the objective above, a second technical solution adopted by the present invention is a degradable EVOH high-barrier composite film, such composite film has a structure as follows:

PET/EAA-TIE/EVOH/PP-TIE/PP      Formula (2)

in formula (2), the meanings in a sequence from left to right are as follows:

PET is an outer layer which has a function of a protective layer or presentation layer, a material of the PET is polyester, and a hydrophilic group that the polyester contains is ester group;

EAA-TIE is a first adhesive layer, a material of the EAA-TIE is maleic anhydride-grafted ethylene acrylic copolymer, and hydrophilic groups that the maleic anhydride-grafted ethylene acrylic copolymer contains are carboxyl and anhydride;

EVOH is an intermediate layer which has a function of a barrier layer, a material of the EVOH is ethylene-vinyl alcohol copolymer, and a hydrophilic group that the ethylene-vinyl alcohol copolymer contains is hydroxyl;

PP-TIE is a second adhesive layer, a material of the PP-TIE is maleic anhydride-grafted polypropylene copolymer, and a hydrophilic group that the maleic anhydride-grafted polypropylene copolymer contains is anhydride;

PP is an inner layer which has a function of a heat sealing layer, and a material of the PP is polypropylene without containing a hydrophilic group;

it is innovated in that the materials of various layers in the composite film all obtain approximately-consistent biodegradability by being introduced a biomass, the biomass is a type of additive master batch having biodegradable activity under a condition of a refuse disposal plant or composting, the additive master batch is uniformly added into the materials of various layers in proportion, and then the composite film is prepared through a melting co-extrusion method;

the additive master batch consists of a carrier and an active agent, the active agent is a polymer containing a hydrophilic group, wherein an effective component of the active agent is the hydrophilic group, and the hydrophilic group is at least one of carboxylate, carboxyl, hydroxyl, aldehyde group, acylamino, anhydride and ester group;

in the materials of various layers and additive master batch in formula (2), the hydrophilic groups are arrayed in a sequence of carboxylate, carboxyl, hydroxyl, aldehyde group, acylamino, anhydride and ester group according to the hydrophilic activity from high to low;

the carriers are selected according to the principle of similarity and intermiscibility specific to the materials of various layers;

for the polyester material of the outer layer, the carrier in the additive master batch is polyester;

for the maleic anhydride-grafted ethylene acrylic copolymer material of the first adhesive layer, the carrier in the additive master batch is ethylene acrylic copolymer;

for the ethylene-vinyl alcohol copolymer material of the intermediate layer, the carrier in the additive master batch is polyethylene;

for the maleic anhydride-grafted polypropylene copolymer material of the second adhesive layer, the carrier in the additive master batch is at least one of polypropylene and polyethylene;

for the polypropylene material of the inner layer, the carrier in the additive master batch is polypropylene;

the additive amount of the additive master batch in the materials of each layer is controlled within the range of 0.3-15% of the total mass of the materials of the corresponding layer; the hydrophilic activity of the hydrophilic groups in the additive master batch should be greater than or equal to that of the hydrophilic groups in the materials of each layer in formula (2); by adding the additive master batch, the mole ratios of the hydrophilic groups to carbon atoms of the materials of various layers in formula (2) tend to be consistent, namely, the bioactivities tend to be consistent, so that the degradation rates of the materials of various layers in the composite film tend to be consistent.

An explanation about the content in the technical solutions above is as follows:

1. In the solutions above, in the outer layer, polyester is amorphous polyethylene terephthalate or poly(ethylene terephthalateco-1,4-cylclohexylenedimethylene terephthalate), and a density of the polyester is 1.300-1.400g/cm$^3$. The polyester copolymer prepared by performing copolymerization modification on dicarboxylic acid is called as amorphous polyethylene terephthalate (APET); and the polyester copolymer prepared by performing copolymerization modification on dihydric alcohol is called as poly(ethylene terephthalateco-1,4-cylclohexylenedimethylene terephthalate) (PETG).

2. In the solutions above, in the first adhesive layer, a density of the maleic anhydride-grafted ethylene acrylic copolymer is 0.920-0.940 g/cm$^3$, a mass percent of the grating ratio of maleic anhydride is 0.3-10%; and a mole content of acrylic acid in the ethylene acrylic copolymer is 8-28%.

3. In the solutions above, in the barrier layer, a mole content of ethylene in the ethylene-vinyl alcohol copolymer is 26-48%, and a density is 1.170-1.190 g/cm$^3$.

4. In the first solution above, in the second adhesive layer, a density of the maleic anhydride-grafted polyethylene copolymer is 0.910-0.950 g/cm$^3$, and a mass percent of a grating ratio of maleic anhydride is 0.3-10%.

5. In the second solution above, in the second adhesive layer, a density of the maleic anhydride-grafted polypropylene copolymer is 0.880-0.910 g/cm$^3$, and a mass percent of a grating ratio of maleic anhydride is 0.3-10%.

6. In the first solution above, in the heat sealing layer, the polyethylene has a density of 0.900-0.935 g/cm$^3$, and contains a polyethylene copolymer, the polyethylene copolymer has a density of 0.910-0.925 g/cm$^3$ and consists of 50-99 wt % of polyethylene and 1-50 wt % of vinyl homopolymer, or the polyethylene copolymer consists of 50-99 wt % of polyethylene and 1-50 wt % of vinyl copolymer, the vinyl copolymer consists of ethylene and at least one of C4-C12 α-olefin, cycloolefin, vinyl arene and polar vinyl monomer, and a density of the vinyl copolymer is 0.880-0.915 g/cm$^3$.

7. In the second solution above, the heat sealing layer adopts polypropylene, the polypropylene consists of isotactic polypropylene homopolymer or/and polypropylene random copolymer, and a density of the polypropylene is 0.880-0.910 g/cm$^3$.

8. In the solutions above, the outer layer has a function of protective layer or presentation layer, wherein, when its function is the protective layer, the outer layer plays roles of wear resistance and temperature resistance; and when its function is the presentation layer, the outer layer can be used for printing and presenting relevant information or transparently presenting a packaged content.

9. In the solutions above, the composite film can obtain corresponding additional functions by coating, metal evaporating and compositing.

A technical principle of the present invention is that the composite film consists of two types of materials including a hydrophilic material and a hydrophobic material, wherein the hydrophilic material contains a hydrophilic group per se, and has a biodegradability function under the condition of a garbage disposal plant or composting; while the hydrophobic material contains no hydrophilic group and is endowed with the biodegradability function by adding the hydrophilic group to the hydrophobic material, the additive master batch is added to the materials of various layers in proportion, the carrier and active agent are fully dissolved through a blending manner, then a composite film is prepared through a melting co-extrusion method, under high-temperature and high-shearing actions, the macromolecular chains are stably combined together through a hydrogen-bond interaction and mutual bending and twisting among the macromolecular chains to form stable macromolecular aggregate, and in this way, the hydrophilic groups in the active agent are added and uniformly dispersed to the materials of various layers; in a biodegradable environment, the degradable active agent is subjected to microbial decomposition at first to cause molecular chain fracture, while the carrier connected to the active agent through hydrogen bonds is also subjected to molecular chain fracture, and further, decomposition of such macromolecular aggregate is caused. Therefore, an aim of biodegradation of the plastic composite film is achieved.

The biodegradation process of the present invention is started with specific expansion. Due to bioactive compounds in the plastic, carbonic polymer is easier subjected to invasion of microbial bacteria. After the microbial bacteria devour the bioactive compounds, acidic materials are generated, such that a substrate of the carbonic polymer is expanded. When expansion encounters heat and water content, a molecular structure of the carbonic polymer is expanded. After the expansion creates a space in the molecular structure of the polymer, a combination of the bioactive compounds and the master batch will attract microorganisms that can metabolize and neutralize the polymer. These microorganisms secrete acid liquor to further shear molecular long chains of the polymer till the polymer is discomposed into inert humus, carbon dioxide and methane. Such biodegradation process can be performed under an aerobic environment, and can also be performed under an anaerobic environment; it can be performed under conditions of lighting, heat and humidity and can also performed under the conditions without the lighting, heat and humidity. Key points of the technical solutions of the present invention are that the hydrophilic activity of the hydrophilic groups in the additive master batch should be greater than or equal to that of the hydrophilic groups in the materials of each layer of the composite film; by adding the additive master batch, the mole ratios of the hydrophilic groups to carbon atoms of the materials of various layers in the composite film tend to be consistent, namely, the bioactivities tend to be consistent, so that the degradation rates of the materials of various layers in the composite film tend to be consistent. When the biomass is added, the additive master batch of which the hydrophilic activity is greater than that of the materials in the composite film is selected to be added to the materials of various layers of the composite film, the original hydrophilic activity in the composite film material is weakened. By adding the additive master batch, the mole ratios of the hydrophilic groups to carbon atoms of the materials of various layers in the composite film tend to be consistent, so that the degradation rates of the materials of various layers in the composite film tend to be consistent.

The present invention makes contribution to obtaining approximately-consistent bioactivities of the materials of various layers in the composite film by balancing the mole ratios of the hydrophilic groups to carbon atoms and the hydrophilic activity in the materials of various layers, such that the biodegradation rates of the materials of various layers of the composite film tend to be consistent; and when the additive amount is 0.3-15% of a total mass of the materials of the corresponding layer, the appearance, the functions and the physical and mechanical properties of a product remain unchanged before the film is subjected to composting.

DETAILED DESCRIPTION

The present invention is further described in combination with embodiments.

Embodiment 1: (Examples of the First Technical Solution)

A degradable EVOH high-barrier composite film has a structure as follows:

PET/EAA-TIE/EVOH/PE-TIE/PE    Formula (1)

in formula (1), the meanings in a sequence from left to right are as follows:

PET is an outer layer which has a function of a protective layer or presentation layer, a material of the PET is polyester, a monomer molecular formula is [OCH2-CH2OCOC6H4CO], and a hydrophilic group that the polyester contains per se is ester group —COO—;

EAA-TIE is a first adhesive layer, a material of the EAA-TIE is maleic anhydride-grafted ethylene acrylic copolymer which is formed by mixing 95 wt % of ethylene acrylic acid and 5 wt % of maleic anhydride, and a monomer molecular formula of the EAA-TIE is {[CH2-CH2]15.5[CH2-CH(COOH)]1}3.7[C4H2O3]1. Hydrophilic groups that the maleic anhydride-grafted ethylene acrylic copolymer per se contains are carboxyl —COOH and anhydride OC—O—CO;

EVOH is an intermediate layer which has a function of a barrier layer, a material of the EVOH is EVOH indicating ethylene-vinyl alcohol copolymer. Ethylene-vinyl alcohol copolymer is formed by 32 wt % of ethylene PE and 68 wt % of vinyl alcohol PVA, and its monomer molecular formula is $[CH_2CH_2]_1[CH_2CHOH]_{1.4}$. A hydrophilic group that the ethylene-vinyl alcohol copolymer contains is hydroxyl —OH;

PE-TIE is a second adhesive layer, a material of the PE-TIE is maleic anhydride-grafted polyethylene copolymer. Maleic anhydride-grafted polyethylene copolymer is formed by mixing 95 wt % of polyethylene and 5 wt % of maleic anhydride. and A monomer molecular formula of the PE-TIE is $—[CH_2—CH_2]_n—[C_4H_2O_3]_m$. A hydrophilic group that the maleic anhydride-grafted polyethylene copolymer contains is anhydride —OC—O—CO—;

PE is an inner layer which has a function of a heat sealing layer, a material of the PE is polyethylene, a monomer molecular formula of the PE is $—[CH_2—CH_2]_n—$, and the polyethylene contains no hydrophilic group per se.

In the outer layer, the polyester is amorphous polyethylene terephthalate. In actual use, if poly(ethylene terephthalateco-1,4-cylclohexylenedimethylene terephthalate) is adopted, the same effect can also be achieved; in the present embodiment, a density of the polyester is 1.360 g/cm$^3$; in actual use, if the density of the polyester is 1.300 g/cm$^3$, 1.400 g/cm$^3$ or other values between 1.300-1.400 g/cm$^3$, the same effect can also be achieved.

In the first adhesive layer, a density of the maleic anhydride-grafted ethylene acrylic copolymer is 0.940 g/cm$^3$.

In actual use, if the density of the maleic anhydride-grafted ethylene acrylic copolymer is 0.920 g/cm$^3$, 0.930 g/cm$^3$ or other values between and 0.920-0.940 g/cm$^3$, the same effect can also be achieved; in the present embodiment, a mass percent of the grating ratio of maleic anhydride is 5 wt %, and in actual use, if 0.3 wt %, 8 wt %, 10 wt % or other values between 0.3-10 wt % is adopted, the same effect can also be achieved. A mole content of acrylic acid in the ethylene acrylic copolymer is 14%, and in actual use, if 28%, 20% or other values between 8-28% is adopted, the same effect can also be achieved.

In the barrier layer, a density of the ethylene-vinyl alcohol copolymer is 1.170/cm$^3$, and in actual use, if the density is 1.190 g/cm$^3$, 1.18 g/cm$^3$ and other values between 1.170-1.190 g/cm$^3$, the same effect can also be achieved, and a mole content of ethylene in the ethylene-vinyl alcohol copolymer is 32%; in actual use, if a mole content of ethylene of 26%, 30%, 48% or other value between 26-48% is adopted, the same effect can also be achieved.

In the second adhesive layer, a density of the maleic anhydride-grafted polyethylene copolymer is 0.910 g/cm$^3$. In actual use, if the density is 0.950 g/cm$^3$, 0.0300.950 g/cm$^3$ or other values between 0.910-0.950 g/cm$^3$, the same effect can also be achieved, and a mass percent of a grating ratio of maleic anhydride is 5 wt %. In actual use, if 0.3 wt %, 8 wt %, 10 wt % or other values between 0.3-10 wt % is adopted, the same effect can also be achieved.

In the heat sealing layer, the polyethylene has a density of 0.900-0.935 g/cm$^3$, and the same effect can also be achieved if the density is 0.900 g/cm$^3$, 0.940 g/cm$^3$ or other values between 0.900-0.935 g/cm$^3$; the polyethylene contains a polyethylene copolymer, the polyethylene copolymer has a density of 0.910-0.925 g/cm$^3$, and the same effect can also be achieved if 0.910 g/cm$^3$, 0.925 g/cm$^3$, 0.920 g/cm$^3$ or other values between 0.910-0.925 g/cm$^3$ is adopted; the polyethylene copolymer consists of 50-99 wt % of polyethylene and 1-50 wt % of vinyl homopolymer, and the same effect can also be achieved if 50 wt % of polyethylene and 50 wt % of vinyl homopolymer, or 99 wt % of polyethylene and 1 wt % of vinyl homopolymer or 75 wt % of polyethylene and 25 wt % of vinyl homopolymer is adopted; the vinyl copolymer consists of ethylene and at least one of C4-C12 α-olefin, cycloolefin, vinyl arene and polar vinyl monomer, and a density of the vinyl copolymer is 0.880-0.915 g/cm$^3$; the same effect can also be achieved if 0.910 g/cm$^3$, 0.915 g/cm$^3$, 0.900 g/cm$^3$ or other values between 0.880-0.915 g/cm$^3$ is adopted.

The materials of various layers in the composite film all obtain approximately-consistent biodegradability by being introduced a biomass. The biomass is a type of additive master batch having biodegradable activity under a condition of a refuse disposal plant or composting. The additive master batch is uniformly added into the materials of various layers in proportion, and then the composite film is prepared through a melting co-extrusion method.

The additive master batch consists of a carrier and an active agent, the active agent is a polymer containing a hydrophilic group, wherein an effective component of the active agent is the hydrophilic group, and the hydrophilic group is at least one of carboxylate —COO$^-$, carboxyl —COOH, hydroxyl —OH, aldehyde group —CHO, acylamino —CONH$_2$, anhydride —OC—O—CO— and ester group —COOR.

In the materials of various layers in formula (1) and the additive master batch, the hydrophilic groups are arrayed in a sequence of carboxylate —COO$^-$, carboxyl —COOH, hydroxyl —OH, aldehyde group —CHO, acylamino —CONH$_2$, anhydride —OC—O—CO — and ester group —COOR according to the hydrophilic activity from high to low.

The carriers are selected according to the principle of similarity and intermiscibility specific to the materials of various layers;
for the polyester material of the outer layer, the carrier in the additive master batch is polyester;
for the maleic anhydride-grafted ethylene acrylic copolymer material of the first adhesive layer, the carrier in the additive master batch is ethylene acrylic copolymer;
for the ethylene-vinyl alcohol copolymer material of the intermediate layer, the carrier in the additive master batch is polyethylene;
for the maleic anhydride-grafted polyethylene copolymer material of the second adhesive layer, the carrier in the additive master batch is polyethylene;
for the polyethylene material of the inner layer, the carrier in the additive master batch is polyethylene;

The additive amount of the additive master batch in the materials of each layer is controlled within the range of 0.3-15% of the total mass of the materials of the corresponding layer; the hydrophilic activity of the hydrophilic groups in the additive master batch should be greater than or equal to that of the hydrophilic groups in the materials of each layer in formula (1); by adding the additive master batch, the mole ratios of the hydrophilic groups to carbon atoms of the materials of various layers in formula (1) tend to be consistent, namely, the bioactivities tend to be consistent, so that the degradation rates of the materials of various layers in the composite film tend to be consistent.

The hydrophilic groups contained in the various materials in the composite film structure according to embodiment 1 are arrayed in a sequence of carboxyl>hydroxyl>anhydride>ester group according to the hydrophilic activity from high to low, that is, the materials of various layers in formula (1) are arrayed in a sequence of maleic anhydride-grafted ethylene acrylic copolymer EAA-TIE (95% EAA+5% maleic anhydride)>ethylene-vinyl alcohol copolymer EVOH (32% PE+68% PVA)>PE-TIE (5% PE+5% maleic anhydride)>polyester PET>polyethylene PE according to the hydrophilic activity from high to low.

Sodium alginate of which the hydrophilic activity is larger than that of EAA-TIE(carboxyl) in the composite film material is selected as the additive active agent and the hydrophilic activity of the original hydrophilic groups in the composite film material is weakened.

1. A monomer molecular formula of the sodium alginate is known as $(C_5H_7O_4COONa)_n$. It can be known from the monomer molecular formula that the hydrophilic groups contained in the sodium alginate are carboxylic sodium (—COONa), hydroxyl (—OH) and ester group (—COOR), wherein the hydrophilic activity of the carboxylic sodium (—COONa) is larger than that of the carboxyl (—COOH), and the hydrophilic activity of the carboxylic sodium (—COONa) in sodium alginate is larger than that of the carboxyl (—COOH) in the maleic anhydride-grafted ethylene acrylic copolymer EAA-TIE (95% EAA+5% maleic anhydride). Therefore, in the present embodiment, the polymer sodium alginate is selected as the active agent to be added to the materials of various layers.

2. Since the hydrophilic activity of the carboxylic sodium in sodium alginate is larger than that of the carboxyl (—COOH) in the maleic anhydride-grafted ethylene acrylic copolymer EAA-TIE (95% EAA+5% maleic anhydride) having the highest hydrophilic activity in the composite film material, the sodium alginate plays a main role in a biodegradation process, while the action of the hydrophilic activity of the carboxyl (—COOH) in the maleic anhydride-grafted ethylene acrylic copolymer EAA-TIE (95% EAA+5% maleic anhydride), that of the hydroxyl in EVOH, that of the anhydride in PE-TIE and that of the ester group in PET in the composite film material are weakened. For simplifying expression, it is assumed in the following calculation that mole ratios of the hydrophilic groups to carbon atoms of the EAA-TIE, EVOH, PE-TIE and PET are 0.

3. Through calculation, it can be obtained that a mole ratio of the hydrophilic groups to the carbon atoms in sodium alginate is 2/3.

4. The mole ratios of the hydrophilic groups to the carbon atoms in EAA-TIE, EVOH, PE-TIE, PET and PE are 0.

5. Since an additive amount of the additive master batch is less and the carrier in the additive master batch is the same as or similar to the added polymer, the mass of the carrier in the additive maser batch in the following calculation is omitted in order to simplify expression.

Mass percents of the sodium alginate added to the materials of various layers are respectively calculated by taking 1 mol % and 2.2 mol % of sodium alginate additive amounts as reference values.

A. 1 mol % of Sodium Alginate Additive Amount

The materials of various layers in formula (1) and the sodium alginate are respectively mixed at a mole ratio of 99:1, and a mole ratio of the hydrophilic groups to the carbon atoms after the sodium alginate is added to the materials of various layers is calculated:

$99/100*\text{polyester}_{(n\ hydrophilic\ groups:n\ carbon\ atoms)} + 1/100*\text{sodium alginate}_{(n\ hydrophilic\ groups:n\ carbon\ atoms)} = 99/100*0 + 1/100*2/3 = 0.0067$;

$99/100*\text{maleic anhydride-grafted ethylene acrylic copolymer}_{(n\ hydrophilic\ groups:n\ carbon\ atoms)} + 1/100*\text{sodium alginate}_{(n\ hydrophilic\ groups:n\ carbon\ atoms)} = 99/100*0 + 1/100*2/3 = 0.0067$;

$99/100*\text{ethylene-vinyl alcohol copolymer}_{(n\ hydrophilic\ groups:n\ carbon\ atoms)} + 1/100*\text{sodium alginate}_{(n\ hydrophilic\ groups:n\ carbon\ atoms)} = 99/100*0 + 1/100*2/3 = 0.0067$;

$99/100*\text{maleic anhydride-grafted polyethylene copolymer}_{(n\ hydrophilic\ groups:n\ carbon\ atoms)} + 1/100*\text{sodium alginate}_{(n\ hydrophilic\ groups:n\ carbon\ atoms)} = 99/100*0 + 1/100*2/3 = 0.0067$;

$99/100*\text{polyethylene}_{(n\ hydrophilic\ groups:n\ carbon\ atoms)} + 1/100*\text{sodium alginate}_{(n\ hydrophilic\ groups:n\ carbon\ atoms)} = 99/100*0 + 1/100*2/3 = 0.0067$;

It can be obtained from above calculation that in the PET/EAA-TIE/EVOH/PE-TIE/PE structure, the materials of various layers and the sodium alginate are respectively mixed at a mole ratio of 99:1, the mole ratios of the hydrophilic groups to the carbon atoms after mixing are calculated to be the same, that is, the hydrophilic activities of the materials of various layers tend to be consistent, and degradation rates tend to be consistent. An additive mass of the sodium alginate in the materials of various layers is calculated as follows:

The PET to which the sodium alginate is added is set to be 1 mol, the mass of the PET is $m_{1-1}$ and the mass of the sodium alginate is $m_{2-1}$;

$m_{1-1}$=molecular weight of PET (g/mol)*PET content (%)*mole weight (mol)
=192.17*99%*1=190.25 g;

$m_{2-1}$=molecular weight of sodium alginate (g/mol)*sodium alginate content (%)*mole weight (mol)
=198.12*1%*1=1.98 g;

The EAA-TIE to which the sodium alginate is added is set to be 1 mol, the mass of the EAA-TIE is $m_{1-2}$ and the mass of the sodium alginate is $m_{2-2}$;

$m_{1-2}$=molecular weight of EAA-TIE (g/mol)*EAA-TIE content (%)*mole weight (mol)
=37.41*99%*1=39.39 g;

$m_{2-2}$=molecular weight of sodium alginate (g/mol)*sodium alginate content (%)*mole weight (mol)
=198.12*1%*1=1.98 g;

The EVOH to which the sodium alginate is added is set to be 1 mol, the mass of the EVOH is $m_{1-3}$ and the mass of the sodium alginate is $m_{2-3}$;

$m_{1-3}$=molecular weight of EVOH (g/mol)*EVOH content (%)*mole weight (mol)
=89.73 *99%*1=88.83 g;

$m_{2-3}$=molecular weight of sodium alginate (g/mol)*sodium alginate content (%)*mole weight (mol)
=198.12*1%*1=1.98 g;

The PE-TIE to which the sodium alginate is added is set to be 1 mol, the mass of the PE-TIE is $m_{1-4}$ and the mass of the sodium alginate is $m_{2-4}$;

$m_{1-4}$=molecular weight of PE-TIE (g/mol)*PE-TIE content (%)*mole weight (mol)
=32.67*99%*1=32.34 g;

$m_{2-4}$=molecular weight of sodium alginate (g/mol)*sodium alginate content (%)*mole weight (mol)
=198.12*1%*1=1.98 g;

The PE to which the sodium alginate is added is set to be 1 mol, the mass of the PE is $m_{1-5}$ and the mass of the sodium alginate is $m_{2-5}$;

$m_{1-5}$=molecular weight of PE (g/mol)*PE content (%)*mole weight (mol)
=28.05*99%*1=27.77 g;

$m_{2-5}$=molecular weight of sodium alginate (g/mol)*sodium alginate content (%)*mole weight (mol)
=198.12*1%*1=1.98 g;

By taking the outer layer PET as an example, the mass percent of the added sodium alginate accounting for the mass of the PET is 1.98/(190.25+1.98)*100%=1.03%; and the mass percent of the added sodium alginate in the materials of various layers is calculated in the same manner; A ratio of the additive mass percents of the sodium alginate of PET/EAA-TIE/EVOH/PE-TIE/PE from left to right is 1.03/4.79/2.18/5.77/6.66.

B. 2.2 mol % of Sodium Alginate Additive Amount

The materials of various layers in formula (1) and the sodium alginate are respectively mixed at a mole ratio of 97.8:2.2, and a mole ratio of the hydrophilic groups to the carbon atoms after the sodium alginate is added to the materials of various layers is calculated:

$97.8/100*\text{polyester}_{(n\ hydrophilic\ groups:n\ carbon\ atoms)} + 2.2/100*\text{sodium alginate}_{(n\ hydrophilic\ groups:n\ carbon\ atoms)} = 97.8/100*0 + 2.2/100*2/3 = 0.0147$;

$97.8/100*\text{maleic anhydride-grafted ethylene acrylic copolymer}_{(n\ hydrophilic\ groups:n\ carbon\ atoms)} + 2.2/100*\text{sodium alginate}_{(n\ hydrophilic\ groups:n\ carbon\ atoms)} = 97.8/100*0 + 2.2/100*2/3 = 0.0147$;

$97.8/100*\text{ethylene-vinyl alcohol copolymer}_{(n\ hydrophilic\ groups:n\ carbon\ atoms)} + 2.2/100*\text{sodium alginate}_{(n\ hydrophilic\ groups:n\ carbon\ atoms)} = 97.8/100*0 + 2.2/100*2/3 = 0.0147$;

$97.8/100*\text{maleic anhydride-grafted polyethylene copolymer}_{(n\ hydrophilic\ groups:n\ carbon\ atoms)} + 2.2/100*\text{sodium alginate}_{(n\ hydrophilic\ groups:n\ carbon\ atoms)} = 97.8/100*0 + 2.2/100*2/3 = 0.0147$;

$97.8/100*\text{polyethylene}_{(n\ hydrophilic\ groups:n\ carbon\ atoms)} + 2.2/100*\text{sodium alginate}_{(n\ hydrophilic\ groups:n\ carbon\ atoms)} = 97.8/100*0 + 2.2/100*2/3 = 0.0147$;

It can be obtained from above calculation that in the PET/EAA-TIE/EVOH/PE-TIE/PE structure, the materials of various layers and the sodium alginate are respectively mixed at a mole ratio of 97.8:2.2, the mole ratios of the hydrophilic groups to the carbon atoms after mixing are calculated to be the same, that is, the hydrophilic activities of the materials of various layers tend to be consistent, and degradation rates tend to be consistent. An additive mass of the sodium alginate in the materials of various layers is calculated as follows:

The PET to which the sodium alginate is added is set to be 1 mol, the mass of the PET is $m_{1-1}$ and the mass of the sodium alginate is $m_{2-1}$;

$m_{1-1}$=molecular weight of PET (g/mol)*PET content (%)*mole weight (mol) =192.17*97.8%*1=187.94 g;

$m_{2-1}$=molecular weight of sodium alginate (g/mol)*sodium alginate content (%)*mole weight (mol) =198.12*2.2%*1=4.36 g;

The EAA-TIE to which the sodium alginate is added is set to be 1 mol, the mass of the EAA-TIE is $m_{1-2}$ and the mass of the sodium alginate is $m_{2-2}$;

$m_{1-2}$=molecular weight of EAA-TIE (g/mol)*EAA-TIE content (%)*mole weight (mol) =37.41*97.8%*1=36.59 g;

$m_{2-2}$=molecular weight of sodium alginate (g/mol)*sodium alginate content (%)*mole weight (mol) =198.12*2.2%*1=4.36 g;

The EVOH to which the sodium alginate is added is set to be 1 mol, the mass of the EVOH is $m_{1-3}$ and the mass of the sodium alginate is $m_{2-3}$;

$m_{1-3}$=molecular weight of EVOH (g/mol)*EVOH content (%)*mole weight (mol) =89.73*97.8%*1=87.76 g;

$m_{2-3}$=molecular weight of sodium alginate (g/mol)*sodium alginate content (%)*mole weight (mol) =198.12*2.2%*1=4.36 g;

The PE-TIE to which the sodium alginate is added is set to be 1 mol, the mass of the PE-TIE is $m_{1-4}$ and the mass of the sodium alginate is $m_{2-4}$;

$m_{1-4}$=molecular weight of PE-TIE (g/mol)*PE-TIE content (%)*mole weight (mol) =32.67*97.8%*1=31.59 g;

$m_{2-4}$=molecular weight of sodium alginate (g/mol)*sodium alginate content (%)*mole weight (mol) =198.12*2.2%*1=4.36 g;

The PE to which the sodium alginate is added is set to be 1 mol, the mass of the PE is $m_{1-5}$ and the mass of the sodium alginate is $m_{2-5}$;

$m_{1-5}$=molecular weight of PE (g/mol)*PE content (%)*mole weight (mol) =28.05*97.8%*1=27.43 g;

$m_{2-5}$=molecular weight of sodium alginate (g/mol)*sodium alginate content (%)*mole weight (mol) =198.12*2.2%*1=4.36 g;

By taking the outer layer PET as an example, the mass percent of the added sodium alginate accounting for the mass of the PET is 4.36/(187.94+4.36)*100%=2.27%; and the mass percent of the added sodium alginate in the materials of various layers is calculated in the same manner;

A ratio of the additive mass percents of the sodium alginate of PET/EAA-TIE/EVOH/PE-TIE/PE from left to right is 2.27/10.65/4.73/12.01/13.72.

When the additive amount of the sodium alginate accounting for the total mass of the material of the corresponding layer is in a range of 0.3-15%, there is no influence on the mechanical properties and barrier performance of the material of such layer In order to improve the processing suitability and dispersity of the hydrophilic groups, polymers with very excellent intermiscibility can be selected for copolymerization, for example, a copolymer copolymerized by polycaprolactone (PCL) and sodium alginate and a copolymer copolymerized by polylactic acid (PLA) and sodium alginate.

A. Copolymer Copolymerized by Polycaprolactone (PCL) and Sodium Alginate

1. A monomer molecular formula of the sodium alginate is known as $(C_5H_7O_4COONa)_n$, and a monomer molecular formula of the polycaprolactone is known as $[CH_2-(CH_2)_4-COO]_m$. A monomer molecular formula of sodium alginate-grafted polycaprolactone copolymer with a grafting ratio being 50-80 mass % is $[CH_2-(CH_2)_4-COO]_m(C_5H_7O_4COONa)_n$ It can be known from the monomer molecular formula that the hydrophilic groups contained in the sodium alginate are carboxylic sodium (—COONa), hydroxyl (—OH) and ester group (—COOR), and the hydrophilic group contained in the polycaprolactone is ester group (—COOR), wherein the hydrophilic activity of the carboxylic sodium (—COONa) is larger than that of the carboxyl (—COOH), and the hydrophilic activity of the carboxylic sodium (—COONa) in sodium alginate is larger than that of the carboxyl (—COOH) in the maleic anhydride-grafted ethylene acrylic copolymer EAA-TIE (95% EAA+5% maleic anhydride). In the present embodiment, the sodium alginate-grafted polycaprolactone copolymer is selected as the active agent to be added to the materials of various layers, wherein a mass percent of a grafting ratio of the sodium alginate is 60%.

2. Since the hydrophilic activity of the carboxylic sodium in the copolymer is larger than that of the carboxyl (—COOH) in the maleic anhydride-grafted ethylene acrylic copolymer EAA-TIE (95% EAA+5% maleic anhydride) having the highest hydrophilic activity in the composite film material, the copolymer plays a main role in a biodegradation process, while the action of the hydrophilic activity of the carboxyl (—COOH) in the maleic anhydride-grafted ethylene acrylic copolymer EAA-TIE (95% EAA+5% maleic anhydride), that of the hydroxyl in EVOH, that of the anhydride in PE-TIE and that of the ester group in PET in the composite film material are weakened. For simplifying expression, it is assumed in the following calculation that mole ratios of the hydrophilic groups to carbon atoms of the EAA-TIE, EVOH, PE-TIE and PET are 0.

3. A mole ratio of the hydrophilic groups to carbon atoms in the sodium alginate in the sodium alginate-grafted polycaprolactone copolymer is 2/3; a mole ratio of the hydrophilic groups to carbon atoms in the polycaprolactone is 1/7; through calculation, it can be obtained that a mole ratio of the hydrophilic groups to the carbon atoms in sodium alginate-grafted polycaprolactone copolymer is 2/3*60%+1/7*40%=0.4571.

4. The mole ratios of the hydrophilic groups to the carbon atoms in EAA-TIE, EVOH, PE-TIE, PET and PE are 0.

5. Since an additive amount of the additive master batch is less and the carrier in the additive master batch is the same as or similar to the added polymer, the mass of the carrier in the additive maser batch in the following calculation is omitted in order to simplify expression.

Mass percents of the sodium alginate-grafted polycaprolactone copolymer added to the materials of various layers are respectively calculated by taking 2 mol % of sodium alginate-grafted polycaprolactone copolymer additive amount as a reference value.

The materials of various layers in formula (1) and the sodium alginate-grafted polycaprolactone copolymer are respectively mixed at a mole ratio of 98:2, and a mole ratio of the hydrophilic groups to the carbon atoms after the sodium alginate-grafted polycaprolactone copolymer is added to the materials of various layers is calculated:

98/100*polyester$_{(n\ hydrophilic\ groups:n\ carbon\ atoms)}$+2/100*sodium alginate-grafted polycaprolactone copolymer$_{(n\ hydrophilic\ groups:n\ carbon\ atoms)}$=98/100*0+2/100*45.71/100=0.0091;

98/100*maleic anhydride-grafted ethylene acrylic copolymer$_{(n\ hydrophilic\ groups:n\ carbon\ atoms)}$+2/100*sodium alginate-grafted polycaprolactone copolymer$_{(n\ hydrophilic\ groups:n\ carbon\ atoms)}$=98/100*0+2/100*45.71/100=0.0091;

98/100*ethylene-vinyl alcohol copolymer$_{(n\ hydrophilic\ groups:n\ carbon\ atoms)}$+2/100*sodium alginate-grafted polycaprolactone copolymer$_{(n\ hydrophilic\ groups:n\ carbon\ atoms)}$=98/100*0+2/100*45.71/100=0.0091;

98/100*maleic anhydride-grafted polyethylene copolymer$_{(n\ hydrophilic\ groups:n\ carbon\ atoms)}$+2/100*sodium alginate-grafted polycaprolactone copolymer$_{(n\ hydrophilic\ groups:n\ carbon\ atoms)}$=98/100*0+2/100*45.71/100=0.0091;

98/100*polyethylene$_{(n\ hydrophilic\ groups:n\ carbon\ atoms)}$+2/100*sodium alginate-grafted polycaprolactone copolymer$_{(n\ hydrophilic\ groups:n\ carbon\ atoms)}$=98/100*0+2/100*45.71/100=0.0091;

It can be obtained from above calculation that in the PET/EAA-TIE/EVOH/PE-TIE/PE structure, the materials of various layers and the sodium alginate-grafted polycaprolactone copolymer are respectively mixed at a mole ratio of 98:2, the mole ratios of the hydrophilic groups to the carbon atoms after mixing are calculated to be the same, that is, the hydrophilic activities of the materials of various layers tend to be consistent, and degradation rates tend to be consistent. An additive mass of the sodium alginate-grafted polycaprolactone copolymer in the materials of various layers is calculated as follows:

The PET to which the sodium alginate-grafted polycaprolactone copolymer is added is set to be 1 mol, the mass of the PET is $m_{1-1}$ and the mass of the sodium alginate-grafted polycaprolactone copolymer is $m_{2-1}$;

$m_{1-1}$=molecular weight of PET (g/mol)*PET content (%)*mole weight (mol)
=192.17*98%*1=188.33 g;

$m_{2-1}$=molecular weight of sodium alginate-grafted polycaprolactone copolymer (g/mol)*sodium alginate-grafted polycaprolactone copolymer content (%)*mole weight (mol)
=164.52*2%*1=3.29 g;

The EAA-TIE to which the sodium alginate-grafted polycaprolactone copolymer is added is set to be 1 mol, the mass of the EAA-TIE is $m_{1-2}$ and the mass of the sodium alginate-grafted polycaprolactone copolymer is $m_{2-2}$;

$m_{1-2}$=molecular weight of EAA-TIE (g/mol)*EAA-TIE content (%)*mole weight (mol)
=37.41*98%*1=36.66 g;

$m_{2-2}$=molecular weight of sodium alginate-grafted polycaprolactone copolymer (g/mol)*sodium alginate-grafted polycaprolactone copolymer content (%)*mole weight (mol)
=164.52*2%*1=3.29 g;

The EVOH to which the sodium alginate-grafted polycaprolactone copolymer is added is set to be 1 mol, the mass of the EVOH is $m_{1-3}$ and the mass of the sodium alginate-grafted polycaprolactone copolymer is $m_{2-3}$;

$m_{1-3}$=molecular weight of EVOH (g/mol)*EVOH content (%)*mole weight (mol)
=89.73*98%*1=87.94 g;

$m_{2-3}$=molecular weight of sodium alginate-grafted polycaprolactone copolymer (g/mol)*sodium alginate-grafted polycaprolactone copolymer content (%)*mole weight (mol)
=164.52*2%*1=3.29 g;

The PE-TIE to which the sodium alginate-grafted polycaprolactone copolymer is added is set to be 1 mol, the mass of the PE-TIE is $m_{1-4}$ and the mass of the sodium alginate-grafted polycaprolactone copolymer is $m_{2-4}$;

$m_{1-4}$=molecular weight of PE-TIE (g/mol)*PE-TIE content (%)*mole weight (mol)
=32.67*98%*1=32.02 g;

$m_{2-4}$=molecular weight of sodium alginate-grafted polycaprolactone copolymer (g/mol)*sodium alginate-grafted polycaprolactone copolymer content (%)*mole weight (mol)
=164.52*2%*1=3.29 g;

The PE to which the sodium alginate-grafted polycaprolactone copolymer is added is set to be 1 mol, the mass of the PE is $m_{1-5}$ and the mass of the sodium alginate-grafted polycaprolactone copolymer is $m_{2-5}$;

$m_{1-5}$=molecular weight of PE (g/mol)*PE content (%)*mole weight (mol)
=28.05*98%*1=27.49 g;

$m_{2-5}$=molecular weight of sodium alginate-grafted polycaprolactone copolymer (g/mol)*sodium alginate-grafted polycaprolactone copolymer content (%)*mole weight (mol)
=164.52*2%*1=3.29 g;

By taking the outer layer PET as an example, the mass percent of the added sodium alginate-grafted polycaprolactone copolymer accounting for the mass of the PET is 3.29/(188.33+3.29)*100%=1.72%; and the mass percent of the added sodium alginate-grafted polycaprolactone copolymer in the materials of various layers is calculated in the same manner;

a ratio of the additive mass percents of the sodium alginate-grafted polycaprolactone copolymer of PET/EAA-TIE/EVOH/PE-TIE/PE from left to right is 1.72/8.24/3.61/9.32/10.69.

When the additive amount of the sodium alginate-grafted polycaprolactone copolymer accounting for the total mass of the material of the corresponding layer is in a range of 0.3-15%, there is no influence on the mechanical properties and barrier performance of the materials of such layer B. Copolymer Copolymerized by Polylactic Acid (PLA) and Sodium Alginate 1. A monomer molecular formula of the sodium alginate is known as [H—(OCH(CH3)CO)$_2$-OH]$_m$, and a monomer molecular formula of the polycaprolactone is known as [CH$_2$—(CH$_2$)$_4$—COO]$_m$. A monomer molecular formula of sodium alginate-grafted polylactic acid copolymer with a grafting ratio of 5-20 mass % is [H—(OCH(CH3)CO)$_2$—OH]$_m$[C$_5$H$_7$O$_4$COONa]$_n$. It can be known from the monomer molecular formula that the hydrophilic groups contained in the sodium alginate are carboxylic sodium (—COONa), hydroxyl (—OH) and ester group (—COOR), the hydrophilic groups contained in the polylactic acid are carboxyl (—COOH), hydroxyl (—OH) and ester group (—COOR), wherein the hydrophilic activity of the carboxylic sodium (—COONa) is larger than that of the carboxyl (—COOH), the hydrophilic activity of the carboxylic sodium (—COONa) in sodium alginate is larger than that of the carboxyl (—COOH) in the maleic anhydride-grafted ethylene acrylic copolymer EAA-TIE (95% EAA+5% maleic anhydride), the content of the carboxyl (—COOH) in the polylactic acid is larger than that of the carboxyl (—COOH) in the maleic anhydride-grafted ethylene acrylic copolymer EAA-TIE (95% EAA+5% maleic anhydride), and the hydrophilic activity of the carboxyl (—COOH) in the polylactic acid is larger than that of the anhydride(—OC—O—CO—) in the maleic anhydride-grafted ethylene acrylic copolymer EAA-TIE (95% EAA+5% maleic anhydride). In the present embodiment, the sodium alginate-grafted polylactic acid copolymer with a grafting ratio being 10 wt % is selected as the active agent to be added to the materials of various layers.

2. Since the hydrophilic activity of the carboxylic sodium in the sodium alginate-grafted polylactic acid copolymer is larger than that of the carboxyl (—COOH) in the maleic anhydride-grafted ethylene acrylic copolymer EAA-TIE (95% EAA+5% maleic anhydride) having the highest hydrophilic activity in the composite film material, and the content of the carboxyl (—COOH) in the sodium alginate-grafted polylactic acid copolymer is larger than that of the carboxyl (—COOH) in the maleic anhydride-grafted ethylene acrylic copolymer EAA-TIE (95% EAA+5% maleic anhydride), the copolymer plays a main role in a biodegradation process, while the action of the hydrophilic activity of the carboxyl (—COOH) in the maleic anhydride-grafted ethylene acrylic copolymer EAA-TIE (95% EAA+5% maleic anhydride), that of the hydroxyl in EVOH, that of the anhydride in PE-TIE and that of the ester group in PET in the composite film material are weakened I For simplifying expression, it is assumed in the following calculation that mole ratios of the hydrophilic groups to carbon atoms of the EAA-TIE, EVOH, PE-TIE and PET are 0.

3. A mole ratio of the hydrophilic groups to carbon atoms in the sodium alginate in the sodium alginate-grafted polylactic acid copolymer is 2/3; a mole ratio of the hydrophilic groups to carbon atoms in the polylactic acid is 2/3; through calculation, it can be obtained that a mole ratio of the hydrophilic groups to the carbon atoms in sodium alginate-grafted polylactic acid copolymer is $2/3*10\%+2/3*90\%=2/3$.

4. The mole ratios of the hydrophilic groups to the carbon atoms in EAA-TIE, EVOH, PE-TIE, PET and PE are 0.

5. Since an additive amount of the additive master batch is less and the carrier in the additive master batch is the same as or similar to the added polymer, the mass of the carrier in the additive maser batch in the following calculation is omitted in order to simplify expression.

Mass percents of the sodium alginate-grafted polylactic acid copolymer added to the materials of various layers are respectively calculated by taking 1.5 mol % of sodium alginate-grafted polylactic acid copolymer additive amount as a reference value.

The materials of various layers in formula (1) and the sodium alginate-grafted polylactic acid copolymer are mixed at a mole ratio of 98.5:1.5, and a mole ratio of the hydrophilic groups to the carbon atoms after the sodium alginate-grafted polylactic acid copolymer is added to the materials of various layers is calculated:

$98.5/100*$polyester$_{(n\ hydrophilic\ groups:n\ carbon\ atoms)}+1.5/100*$sodium alginate-grafted polylactic acid copolymer$_{(n\ hydrophilic\ groups:n\ carbon\ atoms)}=98.5/100*0+1.5/100*2/3=0.0010$;

$98.5/100*$maleic anhydride-grafted ethylene acrylic copolymer$_{(n\ hydrophilic\ groups:n\ carbon\ atoms)}+1.5/100*$sodium alginate-grafted polylactic acid copolymer$_{(n\ hydrophilic\ groups:n\ carbon\ atoms)}=98.5/100*0+1.5/100*2/3=0.0010$;

$98.5/100*$ethylene-vinyl alcohol copolymer$_{(n\ hydrophilic\ groups:n\ carbon\ atoms)}+1.5/100*$sodium alginate-grafted polylactic acid copolymer$_{(n\ hydrophilic\ groups:n\ carbon\ atoms)}=98.5/100*0+1.5/100*2/3=0.0010$;

$98.5/100*$maleic anhydride-grafted polyethylene copolymer$_{(n\ hydrophilic\ groups:n\ carbon\ atoms)}+1.5/100*$sodium alginate-grafted polylactic acid copolymer$_{(n\ hydrophilic\ groups:n\ carbon\ atoms)}=98.5/100*0+1.5/100*2/3=0.0010$;

$98.5/100*$polyethylene$_{(n\ hydrophilic\ groups:n\ carbon\ atoms)}+1.5/100*$sodium alginate-grafted polylactic acid copolymer$_{(n\ hydrophilic\ groups:n\ carbon\ atoms)}=98.5/100*0+1.5/100*2/3=0.0010$;

It can be obtained from above calculation that in the PET/EAA-TIE/EVOH/PE-TIE/PE structure, the materials of various layers and the sodium alginate-grafted polylactic acid copolymer are respectively mixed at a mole ratio of 98.5:1.5, the mole ratios of the hydrophilic groups to the carbon atoms after mixing are calculated to be the same, that is, the hydrophilic activities of the materials of various layers tend to be consistent, and degradation rates tend to be consistent. An additive mass of the sodium alginate-grafted polylactic acid copolymer in the materials of various layers is calculated as follows:

The PET to which the sodium alginate-grafted polylactic acid copolymer is added is set to be 1 mol, the mass of the PET is $m_{1-1}$ and the mass of the sodium alginate-grafted polylactic acid copolymer is $m_{2-1}$;

$m_{1-1}$=molecular weight of PET (g/mol)*PET content (%)*mole weight (mol)
=192.17*98.5%*1=189.29 g;

$m_{2-1}$=molecular weight of sodium alginate-grafted polylactic acid copolymer (g/mol)*sodium alginate-grafted polylactic acid copolymer content (%)*mole weight (mol)
=165.74*1.5%*1=2.49 g;

The EAA-TIE to which the sodium alginate-grafted polylactic acid copolymer is added is set to be 1 mol, the mass of the EAA-TIE is $m_{1-2}$ and the mass of the sodium alginate-grafted polylactic acid copolymer is $m_{2-2}$;

$m_{1-2}$=molecular weight of EAA-TIE (g/mol)*EAA-TIE content (%)*mole weight (mol)
=37.41*98.5%*1=36.85 g;

$m_{2-2}$=molecular weight of sodium alginate-grafted polylactic acid copolymer (g/mol)*sodium alginate-grafted polylactic acid copolymer content (%)*mole weight (mol)
=165.74*1.5%*1=2.49 g;

The EVOH to which the sodium alginate-grafted polylactic acid copolymer is added is set to be 1 mol, the mass of the EVOH is $m_{1-3}$ and the mass of the sodium alginate-grafted polylactic acid copolymer is $m_{2-3}$;

$m_{1-3}$=molecular weight of EVOH (g/mol)*EVOH content (%)*mole weight (mol)
=89.73*98.5%*1=88.38 g;

$m_{2-3}$=molecular weight of sodium alginate-grafted polylactic acid copolymer (g/mol)*sodium alginate-grafted polylactic acid copolymer content (%)*mole weight (mol)
=165.74*1.5%*1=2.49 g;

The PE-TIE to which the sodium alginate-grafted polylactic acid copolymer is added is set to be 1 mol, the mass of the PE-TIE is $m_{1-4}$ and the mass of the sodium alginate-grafted polylactic acid copolymer is $m_{2-4}$;

$m_{1-4}$=molecular weight of PE-TIE (g/mol)*PE-TIE content (%)*mole weight (mol)
=32.67*98.5%*1=32.18 g;
$m_{2-4}$=molecular weight of sodium alginate-grafted polylactic acid copolymer (g/mol)*sodium alginate-grafted polylactic acid copolymer content (%)*mole weight (mol)
=165.74*1.5%*1=2.49 g;
The PE to which the sodium alginate-grafted polylactic acid copolymer is added is set to be 1 mol, the mass of the PE is $m_{1-5}$ and the mass of the sodium alginate-grafted polylactic acid copolymer is $m_{2-5}$;
$m_{1-5}$=molecular weight of PE (g/mol)*PE content (%)*mole weight (mol)
=28.05*98.5%*1=27.63 g;
$m_{2-5}$=molecular weight of sodium alginate-grafted polylactic acid copolymer (g/mol)*sodium alginate-grafted polylactic acid copolymer content (%)*mole weight (mol)
=165.74*1.5%*1=2.49 g;
By taking the outer layer PET as an example, the mass percent of the added sodium alginate-grafted polylactic acid copolymer accounting for the mass of the PET is 2.49/(189.29+2.49)*100%=1.30%; and the mass percent of the added sodium alginate-grafted polylactic acid copolymer in the materials of various layers is calculated in the same manner;
a ratio of the additive mass percents of the sodium alginate-grafted polylactic acid copolymer of PET/EAA-TIE/EVOH/PE-TIE/PE from left to right is 1.30/6.33/2.74/7.18/8.27.

When the additive amount of the sodium alginate-grafted polylactic acid copolymer accounting for the total mass of the material of the corresponding layer is in a range of 0.3-15%, there is no influence on the mechanical properties and barrier performance of the material of such layer Embodiment 2: (Examples of the Second Technical Solution)

PET/EAA-TIE/EVOH/PP-TIE/PP  Formula (2)

in formula (2), the meanings in a sequence from left to right are as follows:
PET is an outer layer which has a function of a protective layer or presentation layer, a material of the PET is polyester; a monomer molecular formula of the PET is [OCH2-CH2OCOC6H4CO], and a hydrophilic group that the polyester contains per se is ester group —COO—;
EAA-TIE is a first adhesive layer; a material of the EAA-TIE is maleic anhydride-grafted ethylene acrylic copolymer and a monomer molecular formula of the EAA-TIE is $\{[CH_2-CH_2]_{15.5}[CH_2-CH(COOH)]_1\}_{3.7}[C_4H_2O_3]_1$.
Hydrophilic groups that the maleic anhydride-grafted ethylene acrylic copolymer per se contains are carboxyl —COOH and anhydride OC—O—CO;
EVOH is an intermediate layer which has a function of a barrier layer; a material of the EVOH is EVOH indicating ethylene-vinyl alcohol copolymer which is formed by 32 wt % of ethylene PE and 68 wt % of vinyl alcohol PVA; a monomer molecular formula of the EVOH is $[CH_2CH_2]_1[CH_2CHOH]_{1.4}$. A hydrophilic group that the ethylene-vinyl alcohol copolymer contains is hydroxyl —OH;
PP-TIE is a second adhesive layer; a material of the PP-TIE is maleic anhydride-grafted polypropylene copolymer which is formed by mixing 95 wt % of polypropylene and 5 wt % of maleic anhydride, and a monomer molecular formula of the PP-TIE is $-[CH_2-CH(CH_3)]_n-[C_4H_2O_3]_m$. A hydrophilic group that the maleic anhydride-grafted polypropylene copolymer contains is anhydride —OC—O—CO—;
PP is an inner layer which has a function of a heat sealing layer; a material of the PP is polypropylene and a monomer molecular formula of the PP is $-[CH_2-CH(CH_3)]_n-$, and the polypropylene contains no hydrophilic group per se.
In the outer layer, the polyester is amorphous polyethylene terephthalate, in actual use, if poly(ethylene terephthalateco-1,4-cylclohexylenedimethylene terephthalate), the same effect can also be achieved; in the present embodiment, a density of the polyester is 1.360 g/cm$^3$, in actual use, if the density of the polyester is 1.300 g/cm$^3$, 1.400 g/cm$^3$, other values between 1.300-1.400 g/cm$^3$, the same effect can also be achieved.
In the first adhesive layer, a density of the maleic anhydride-grafted ethylene acrylic copolymer is 0.940 g/cm$^3$.
In actual use, if the density of the maleic anhydride-grafted ethylene acrylic copolymer is 0.920 g/cm$^3$, 0.930 g/cm$^3$ or other values between and 0.920-0.940 g/cm$^3$, the same effect can also be achieved; in the present embodiment, a mass percent of the grating ratio of maleic anhydride is 5 wt %, and in actual use, if 0.3 wt %, 8 wt %, 10 wt % or other values between 0.3-10 wt % is adopted, the same effect can also be achieved. A mole content of acrylic acid in the ethylene acrylic copolymer is 14%, and in actual use, if 28%, 20% or other values between 8-28% is adopted, the same effect can also be achieved.
In the barrier layer, a density of the ethylene-vinyl alcohol copolymer is 1.170/cm$^3$, and in actual use, if the density is 1.190 g/cm$^3$, 1.18 g/cm$^3$ or other values between 1.170-1.190 g/cm$^3$, the same effect can also be achieved. A mole content of ethylene in the ethylene-vinyl alcohol copolymer is 32%, and in actual use, if 26%, 30%, 48% or other value between 26-48% is adopted, the same effect can also be achieved.
In the second adhesive layer, a density of the maleic anhydride-grafted polyethylene copolymer is 0.910 g/cm$^3$, and in actual use, if the density is 0.950 g/cm$^3$, 0.0300.950 g/cm$^3$ and other values between 0.910-0.950 g/cm$^3$, the same effect can also be achieved. A mass percent of a grating ratio of maleic anhydride is 5 wt %, and in actual use, if 0.3 wt %, 8 wt %, 10 wt % and other values between 0.3-10 wt % is adopted, the same effect can also be achieved.
In the heat sealing layer, the polyethylene has a density of 0.900-0.935 g/cm$^3$, and the same effect can also be achieved if the density is 0.900 g/cm$^3$, 0.935 g/cm$^3$, 0.940 g/cm$^3$ or other values between 0.900-0.935 g/cm$^3$; the polyethylene contains a polyethylene copolymer, the polyethylene copolymer has a density of 0.910-0.925 g/cm$^3$, and the same effect can also be achieved if 0.910 g/cm$^3$, 0.925 g/cm$^3$, 0.920 g/cm$^3$ or other values between 0.910-0.925 g/cm$^3$ is adopted; the polyethylene copolymer consists of 50-99 wt % of polyethylene and 1-50 wt % of vinyl homopolymer, and the same effect can also be achieved if 50 wt % of polyethylene and 50 wt % of vinyl homopolymer, 99 wt % of polyethylene and 1 wt % of vinyl homopolymer or 75 wt % of polyethylene and 25 wt % of vinyl homopolymer,etc. is adopted; the vinyl copolymer consists of ethylene and at least one of C4-C12 α-olefin, cycloolefin, vinyl arene and polar vinyl monomer, and a density of the vinyl copolymer is 0.880-0.915 g/cm$^3$, and the same effect can also be achieved if 0.910 g/cm$^3$, 0.915 g/cm$^3$, 0.900 g/cm$^3$ or other values between 0.880-0.915 g/cm$^3$ is adopted.
The materials of various layers in the composite film all obtain approximately-consistent biodegradability by introducing biomass. The biomass is a type of additive master batch having biodegradable activity under a condition of a refuse disposal plant or composting, the additive master batch is uniformly added into the materials of various layers in proportion, and then the composite film is prepared through a melting co-extrusion method.

The additive master batch consists of a carrier and an active agent. The active agent is a polymer containing a hydrophilic group, wherein an effective component of the active agent is the hydrophilic group, and the hydrophilic group is at least one of carboxylate —COO$^-$, carboxyl —COOH, hydroxyl —OH, aldehyde group —CHO, acylamino —CONH$_2$, anhydride —OC—O—CO— and ester group —COOR.

In the materials of various layers and additive master batch in formula (2), the hydrophilic groups are arrayed in a sequence of carboxylate —COO$^-$, carboxyl —COOH, hydroxyl —OH, aldehyde group —CHO, acylamino —CONH$_2$, anhydride —OC—O—CO— and ester group —COOR according to the hydrophilic activity from high to low.

The carriers are selected according to the principle of similarity and intermiscibility specific to the materials of various layers;

for the polyester material of the outer layer, the carrier in the additive master batch is polyester;

for the maleic anhydride-grafted ethylene acrylic copolymer material of the first adhesive layer, the carrier in the additive master batch is ethylene acrylic copolymer;

for the ethylene-vinyl alcohol copolymer material of the intermediate layer, the carrier in the additive master batch is polyethylene;

for the maleic anhydride-grafted polyethylene copolymer material of the second adhesive layer, the carrier in the additive master batch is polyethylene;

for the polyethylene material of the inner layer, the carrier in the additive master batch is polyethylene;

The additive amount of the additive master batch in the materials of each layer is controlled within the range of 0.3-15% of the total mass of the materials of the corresponding layer; the hydrophilic activity of the hydrophilic groups in the additive master batch should be greater than or equal to that of the hydrophilic groups in the materials of each layer in formula (2); by adding the additive master batch, the mole ratios of the hydrophilic groups to carbon atoms of the materials of various layers in formula (2) tend to be consistent, namely the bioactivities tend to be consistent, so that the degradation rates of the materials of various layers in the composite film tend to be consistent.

The hydrophilic groups contained in the various materials in the composite film structure according to embodiment 2 are arrayed in a sequence of carboxyl>hydroxyl>anhydride>ester group according to the hydrophilic activity from high to low, that is, the materials of various layers in formula (2) are arrayed in a sequence of maleic anhydride-grafted ethylene acrylic copolymer EAA-TIE (95% EAA+5% maleic anhydride)>ethylene-vinyl alcohol copolymer EVOH (32% PE+68% PVA)>PP-TIE (95% PE+5% maleic anhydride)>polyester PET>polypropylene PP according to the hydrophilic activity from high to low.

Sodium alginate of which the hydrophilic activity is larger than that of EAA-TIE(carboxyl) in the composite film material is selected as the additive active agent and the hydrophilic activity of the original hydrophilic groups in the composite film material is weakened.

1. A monomer molecular formula of the sodium alginate is known as $(C_5H_7O_4COONa)_n$. It can be known from the monomer molecular formula that the hydrophilic groups contained in the sodium alginate are carboxylic sodium (—COONa), hydroxyl (—OH) and ester group (—COOR), wherein the hydrophilic activity of the carboxylic sodium (—COONa) is larger than that of the carboxyl (—COOH), the hydrophilic activity of the carboxylic sodium (—COONa) in sodium alginate is larger than that of the carboxyl (—COOH) in the maleic anhydride-grafted ethylene acrylic copolymer EAA-TIE (95% EAA+5% maleic anhydride). Therefore, in the present embodiment, the polymer sodium alginate is selected as the active agent to be added to the materials of various layers.

2. Since the hydrophilic activity of the carboxylic sodium in sodium alginate is larger than that of the carboxyl (—COOH) in the maleic anhydride-grafted ethylene acrylic copolymer EAA-TIE (95% EAA+5% maleic anhydride) having the highest hydrophilic activity in the composite film material, the sodium alginate plays a main role in a biodegradation process, while the action of the hydrophilic activity of the carboxyl (—COOH) in the maleic anhydride-grafted ethylene acrylic copolymer EAA-TIE (95% EAA+5% maleic anhydride), that of the hydroxyl in EVOH, that of the anhydride in PP-TIE and that of the ester group in PET in the composite film material are weakened. For simplifying expression, it is assumed in the following calculation that mole ratios of the hydrophilic groups to carbon atoms of the EAA-TIE, EVOH, PP-TIE and PET are 0.

3. Through calculation, it can be obtained that a mole ratio of the hydrophilic groups to the carbon atoms in sodium alginate is 2/3.

4. The mole ratios of the hydrophilic groups to the carbon atoms in EAA-TIE, EVOH, PP-TIE, PET and PP are 0.

5. Since an additive amount of the additive master batch is less and the carrier in the additive master batch is the same as or similar to the added polymer, the mass of the carrier in the additive maser batch in the following calculation is omitted in order to simplify expression.

Mass percents of the sodium alginate added to the materials of various layers are respectively calculated by taking 1 mol % and 2.2 mol % of sodium alginate additive amounts as reference values.

A. 1 mol % of Sodium Alginate Additive Amount

The materials of various layers in formula (2) and the sodium alginate are respectively mixed at a mole ratio of 99:1, and a mole ratio of the hydrophilic groups to the carbon atoms after the sodium alginate is added to the materials of various layers is calculated:

99/100*polyester$_{(n\ hydrophilic\ groups:n\ carbon\ atoms)}$+1/100*sodium alginate$_{(n\ hydrophilic\ groups:n\ carbon\ atoms)}$=99/100*0+1/100*2/3=0.0067;

99/100*maleic anhydride-grafted ethylene acrylic copolymer$_{(n\ hydrophilic\ groups:n\ carbon\ atoms)}$+1/100*sodium alginate$_{(n\ hydrophilic\ groups:n\ carbon\ atom)}$=99/100*0+1/100*2/3=0.0067;

99/100*ethylene-vinyl alcohol copolymer$_{(n\ hydrophilic\ groups:n\ carbon\ atoms)}$+1/100*sodium alginate$_{(n\ hydrophilic\ groups:n\ carbon\ atoms)}$=99/100*0+1/100*2/3=0.0067;

99/100*maleic anhydride-grafted polypropylene copolymer$_{(n\ hydrophilic\ groups:n\ carbon\ atoms)}$+1/100*sodium alginate$_{(n\ hydrophilic\ groups:n\ carbon\ atom)}$=99/100*0+1/100*2/3=0.0067;

99/100*polypropylene$_{(n\ hydrophilic\ groups:n\ carbon\ atoms)}$+1/100*sodium alginate$_{(n\ hydrophilic\ groups:n\ carbon\ atoms)}$=99/100*0+1/100*2/3=0.0067;

It can be obtained from above calculation that in the PET/EAA-TIE/EVOH/PP-TIE/PP structure, the materials of various layers and the sodium alginate are respectively mixed at a mole ratio of 99:1, the mole ratios of the hydrophilic groups to the carbon atoms after mixing are calculated to be the same, that is, the hydrophilic activities of the materials of various layers tend to be consistent, and degradation rates tend to be consistent. An additive mass of the sodium alginate in the materials of various layers is calculated as follows:

The PET to which the sodium alginate is added is set to be 1 mol, the mass of the PET is $m_{1-1}$ and the mass of the sodium alginate is $m_{2-1}$;

$m_{1-1}$=molecular weight of PET (g/mol)*PET content (%)*mole weight (mol)
=192.17*99%*1=190.25 g;

$m_{2-1}$=molecular weight of sodium alginate (g/mol)*sodium alginate content (%)*mole weight (mol)
=198.12*1%*1=1.98 g;

The EAA-TIE to which the sodium alginate is added is set to be 1 mol, the mass of the EAA-TIE is $m_{1-2}$ and the mass of the sodium alginate is $m_{2-2}$;

$m_{1-2}$=molecular weight of EAA-TIE (g/mol)*EAA-TIE content (%)*mole weight (mol)
=37.41*99%*1=37.04 g;

$m_{2-2}$=molecular weight of sodium alginate (g/mol)*sodium alginate content (%)*mole weight (mol)
=198.12*1%*1=1.98 g;

The EVOH to which the sodium alginate is added is set to be 1 mol, the mass of the EVOH is $m_{1-3}$ and the mass of the sodium alginate is $m_{2-3}$;

$m_{1-3}$=molecular weight of EVOH (g/mol)*EVOH content (%)*mole weight (mol)
=89.73*99%*1=88.83 g;

$m_{2-3}$=molecular weight of sodium alginate (g/mol)*sodium alginate content (%)*mole weight (mol)
=198.12*1%*1=1.98 g;

The PP-TIE to which the sodium alginate is added is set to be 1 mol, the mass of the PP-TIE is $m_{1-4}$ and the mass of the sodium alginate is $m_{2-4}$;

$m_{1-4}$=molecular weight of PP-TIE (g/mol)*PP-TIE content (%)*mole weight (mol)
=45.56*99%*1=45.10 g;

$m_{2-4}$=molecular weight of sodium alginate (g/mol)*sodium alginate content (%)*mole weight (mol)
=198.12*1%*1=1.98 g;

The PP to which the sodium alginate is added is set to be 1 mol, the mass of the PP is $m_{1-5}$ and the mass of the sodium alginate is $m_{2-5}$;

$m_{1-5}$=molecular weight of PP (g/mol)*PP content (%)*mole weight (mol)
=41.07*99%*1=40.66 g;

$m_{2-5}$=molecular weight of sodium alginate (g/mol)*sodium alginate content (%)*mole weight (mol)
=198.12*1%*1=1.98 g;

By taking the outer layer PET as an example, the mass percent of the added sodium alginate accounting for the mass of the PET is 1.98/(190.25+1.98)*100%=1.03%; and the mass percent of the added sodium alginate in the materials of various layers is calculated in the same manner;

A ratio of the additive mass percents of the sodium alginate of PET/EAA-TIE/EVOH/PP-TIE/PP from left to right is 1.03/5.07/2.18/4.21/4.64.

B. 2.2 mol % of Sodium Alginate Additive Amount

The materials of various layers in formula (2) and the sodium alginate are mixed at a mole ratio of 97.8:2.2, and a mole ratio of the hydrophilic groups to the carbon atoms after the sodium alginate is added to the materials of various layers is calculated:

97.8/100*polyester$_{(n\ hydrophilic\ groups:n\ carbon\ atoms)}$+2.2/100*sodium alginate$_{(n\ hydrophilic\ groups:n\ carbon\ atoms)}$=97.8/100*0+2.2/100*2/3=0.0147;

97.8/100*maleic anhydride-grafted ethylene acrylic copolymer$_{(n\ hydrophilic\ groups:n\ carbon\ atoms)}$+2.2/100*sodium alginate$_{(n\ hydrophilic\ groups:n\ carbon\ atoms)}$=97.8/100*0+2.2/100*2/3=0.0147;

97.8/100*ethylene-vinyl alcohol copolymer$_{(n\ hydrophilic\ groups:n\ carbon\ atoms)}$+2.2/100*sodium alginate$_{(n\ hydrophilic\ groups:n\ carbon\ atoms)}$=97.8/100*0+2.2/100*2/3=0.00147;

97.8/100*maleic anhydride-grafted polypropylene copolymer$_{(n\ hydrophilic\ groups:n\ carbon\ atoms)}$+2.2/100*sodium alginate$_{(n\ hydrophilic\ groups:n\ carbon\ atoms)}$=97.8/100*0+2.2/100*2/3=0.0147;

97.8/100*polypropylene$_{(n\ hydrophilic\ groups:n\ carbon\ atoms)}$+2.2/100*sodium alginate$_{(n\ hydrophilic\ groups:n\ carbon\ atoms)}$=97.8/100*0+2.2/100*2/3=0.0147;

It can be obtained from above calculation that in the PET/EAA-TIE/EVOH/PP-TIE/PP structure, the materials of various layers and the sodium alginate are respectively mixed at a mole ratio of 97.8:2.2, the mole ratios of the hydrophilic groups to the carbon atoms after mixing are calculated to be the same, that is, the hydrophilic activities of the materials of various layers tend to be consistent, and degradation rates tend to be consistent. An additive mass of the sodium alginate in the materials of various layers is calculated as follows:

The PET to which the sodium alginate is added is set to be 1 mol, the mass of the PET is $m_{1-1}$ and the mass of the sodium alginate is $m_{2-1}$;

$m_{1-1}$=molecular weight of PET (g/mol)*PET content (%)*mole weight (mol)
=192.17*97.8%*1=187.94 g;

$m_{2-1}$=molecular weight of sodium alginate (g/mol)*sodium alginate content (%)*mole weight (mol)
=198.12*2.2%*1=4.36 g;

The EAA-TIE to which the sodium alginate is added is set to be 1 mol, the mass of the EAA-TIE is $m_{1-2}$ and the mass of the sodium alginate is $m_{2-2}$;

$m_{1-2}$=molecular weight of EAA-TIE (g/mol)*EAA-TIE content (%)*mole weight (mol)
=37.41*97.8%*1=36.59 g;

$m_{2-2}$=molecular weight of sodium alginate (g/mol)*sodium alginate content (%)*mole weight (mol)
=198.12*2.2%*1=4.36 g;

The EVOH to which the sodium alginate is added is set to be 1 mol, the mass of the EVOH is $m_{1-3}$ and the mass of the sodium alginate is $m_{2-3}$;

$m_{1-3}$=molecular weight of EVOH (g/mol)*EVOH content (%)*mole weight (mol)
=89.73*97.8%*1=87.76 g;

$m_{2-3}$=molecular weight of sodium alginate (g/mol)*sodium alginate content (%)*mole weight (mol)
=198.12*2.2%*1=4.36 g;

The PP-TIE to which the sodium alginate is added is set to be 1 mol, the mass of the PP-TIE is $m_{1-4}$ and the mass of the sodium alginate is $m_{2-4}$;

$m_{1-4}$=molecular weight of PP-TIE (g/mol)*PP-TIE content (%)*mole weight (mol)
=45.56*97.8%*1=44.56 g;

$m_{2-4}$=molecular weight of sodium alginate (g/mol)*sodium alginate content (%)*mole weight (mol)
=198.12*2.2%*1=4.36 g;

The PP to which the sodium alginate is added is set to be 1 mol, the mass of the PP is $m_{1-5}$ and the mass of the sodium alginate is $m_{2-5}$;

$m_{1-5}$=molecular weight of PP (g/mol)*PP content (%)*mole weight (mol)
=41.07*97.8%*1=40.17 g;
$m_{2-5}$=molecular weight of sodium alginate (g/mol)*sodium alginate content (%)*mole weight (mol)
=198.12*2.2%*1=4.36 g;

By taking the outer layer PET as an example, the mass percent of the added sodium alginate accounting for the mass of the PET is 4.36/(187.94+4.36)*100%=2.27%; and the mass percent of the added sodium alginate in the materials of various layers is calculated in the same manner; A ratio of the additive mass percents of the sodium alginate of PET/EAA-TIE/EVOH/PP-TIE/PP from left to right is 2.27/10.65/4.73/8.91/9.79.

When the additive amount of the sodium alginate accounting for the total mass of the material of the corresponding layer is in a range of 0.3-15%, there is no influence on the mechanical properties and barrier performance of the material of such layer.

In order to improve the processing suitability and dispersity of the hydrophilic groups, polymers with very excellent intermiscibility can be selected for copolymerization, for example, a copolymer copolymerized by polycaprolactone (PCL) and sodium alginate and a copolymer copolymerized by polylactic acid (PLA) and sodium alginate.

A. Copolymer Copolymerized by Polycaprolactone (PCL) and Sodium Alginate

1. A monomer molecular formula of the sodium alginate is known as $(C_5H_7O_4COONa)_n$, and a monomer molecular formula of the polycaprolactone is known as $[CH_2-(CH_2)_4-COO]_m$. A monomer molecular formula of sodium alginate-grafted polycaprolactone copolymer with a grafting ratio being 50-80 wt % is $[CH_2-(CH_2)_4-COO]_m(C_5H_7O_4COONa)_n$. It can be known from the monomer molecular formula that the hydrophilic groups contained in the sodium alginate are carboxylic sodium (—COONa), hydroxyl (—OH) and ester group (—COOR), the hydrophilic group contained in the polycaprolactone is ester group (—COOR), wherein the hydrophilic activity of the carboxylic sodium (—COONa) is larger than that of the carboxyl (—COOH), the hydrophilic activity of the carboxylic sodium (—COONa) in sodium alginate is larger than that of the carboxyl (—COOH) in the maleic anhydride-grafted ethylene acrylic copolymer EAA-TIE (95% EAA+5% maleic anhydride). In the present embodiment, the sodium alginate-grafted polycaprolactone copolymer is selected as the active agent to be added to the materials of various layers, wherein a mass percent of a grafting ratio of the sodium alginate is 60%.

2. Since the hydrophilic activity of the carboxylic sodium in the copolymer is larger than that of the carboxyl (—COOH) in the maleic anhydride-grafted ethylene acrylic copolymer EAA-TIE (95% EAA+5% maleic anhydride) having the highest hydrophilic activity in the composite film material, the copolymer plays a main role in a biodegradation process, while the action of the hydrophilic activity of the carboxyl (—COOH) in the maleic anhydride-grafted ethylene acrylic copolymer EAA-TIE (95% EAA+5% maleic anhydride), that of the hydroxyl in EVOH, that of the anhydride in PE-TIE and that of the ester group in PET in the composite film material are weakened. For simplifying expression, it is assumed in the following calculation that mole ratios of the hydrophilic groups to carbon atoms of the EAA-TIE, EVOH, PE-TIE and PET are 0.

3. A mole ratio of the hydrophilic groups to carbon atoms in the sodium alginate in the sodium alginate-grafted polycaprolactone copolymer is 2/3; a mole ratio of the hydrophilic groups to carbon atoms in the polycaprolactone is 1/7; through calculation, it can be obtained that a mole ratio of the hydrophilic groups to the carbon atoms in sodium alginate-grafted polycaprolactone copolymer is 2/3*60%+1/7*40%=0.4571.

4. The mole ratios of the hydrophilic groups to the carbon atoms in EAA-TIE, EVOH, PP-TIE, PET and PP are 0.

5. Since an additive amount of the additive master batch is less and the carrier in the additive master batch is the same as or similar to the added polymer, the mass of the carrier in the additive maser batch in the following calculation is omitted in order to simplify expression.

Mass percents of the sodium alginate-grafted polycaprolactone copolymer added to the materials of various layers are respectively calculated by taking 2 mol % of sodium alginate-grafted polycaprolactone copolymer additive amount as a reference value.

The materials of various layers in formula (2) and the sodium alginate-grafted polycaprolactone copolymer are respectively mixed at a mole ratio of 98:2, and a mole ratio of the hydrophilic groups to the carbon atoms after the sodium alginate-grafted polycaprolactone copolymer is added to the materials of various layers is calculated:

$98/100*\text{polyester}_{(n\ hydrophilic\ groups:n\ carbon\ atoms)}+2/100*\text{sodium alginate-grafted polycaprolactone copolymer}_{(n\ hydrophilic\ groups:n\ carbon\ atoms)}=98/100*0+2/100*45.71/100=0.0091$;

$98/100*\text{maleic anhydride-grafted ethylene acrylic copolymer}_{(n\ hydrophilic\ groups:n\ carbon\ atoms)}+2/100*\text{sodium alginate-grafted polycaprolactone copolymer}_{(n\ hydrophilic\ groups:n\ carbon\ atoms)}=98/100*0+2/100*45.71/100=0.0091$;

$98/100*\text{ethylene-vinyl alcohol copolymer}_{(n\ hydrophilic\ groups:n\ carbon\ atoms)}+2/100*\text{sodium alginate-grafted polycaprolactone copolymer}_{(n\ hydrophilic\ groups:n\ carbon\ atoms)}=98/100*0+2/100*45.71/100=0.0091$;

$98/100*\text{maleic anhydride-grafted polypropylene copolymer}_{(n\ hydrophilic\ groups:n\ carbon\ atoms)}+2/100*\text{sodium alginate-grafted polycaprolactone copolymer}_{(n\ hydrophilic\ groups:n\ carbon\ atoms)}=98/100*0+2/100*45.71/100=0.0091$;

$98/100*\text{polypropylene}_{(n\ hydrophilic\ groups:n\ carbon\ atoms)}+2/100*\text{sodium alginate-grafted polycaprolactone copolymer}_{(n\ hydrophilic\ groups:n\ carbon\ atoms)}=98/100*0+2/100*45.71/100=0.0091$;

It can be obtained from above calculation that in the PET/EAA-TIE/EVOH/PP-TIE/PP structure, the materials of various layers and the sodium alginate-grafted polycaprolactone copolymer are respectively mixed at a mole ratio of 98:2, the mole ratios of the hydrophilic groups to the carbon atoms after mixing are calculated to be the same, that is, the hydrophilic activities of the materials of various layers tend to be consistent, and degradation rates tend to be consistent. An additive mass of the sodium alginate-grafted polycaprolactone copolymer in the materials of various layers is calculated as follows:

The PET to which the sodium alginate-grafted polycaprolactone copolymer is added is set to be 1 mol, the mass of the PET is $m_{1-1}$ and the mass of the sodium alginate-grafted polycaprolactone copolymer is $m_{2-1}$;

$m_{1-1}$=molecular weight of PET (g/mol)*PET content (%)*mole weight (mol)
=192.17*98%*1=188.33 g;
$m_{2-1}$=molecular weight of sodium alginate-grafted polycaprolactone copolymer (g/mol)*sodium alginate-grafted polycaprolactone copolymer content (%)*mole weight (mol)
=164.52*2%*1=3.29 g;
The EAA-TIE to which the sodium alginate-grafted polycaprolactone copolymer is added is set to be 1 mol, the mass of the EAA-TIE is $m_{1-2}$ and the mass of the sodium alginate-grafted polycaprolactone copolymer is $m_{2-2}$;
$m_{1-2}$=molecular weight of EAA-TIE (g/mol)*EAA-TIE content (%)*mole weight (mol)
=37.41*98%*1=36.66 g;
$m_{2-2}$=molecular weight of sodium alginate-grafted polycaprolactone copolymer (g/mol)*sodium alginate-grafted polycaprolactone copolymer content (%)*mole weight (mol)
=164.52*2%*1=3.29 g;
The EVOH to which the sodium alginate-grafted polycaprolactone copolymer is added is set to be 1 mol, the mass of the EVOH is $m_{1-3}$ and the mass of the sodium alginate-grafted polycaprolactone copolymer is $m_{2-3}$;
$m_{1-3}$=molecular weight of EVOH (g/mol)*EVOH content (%)*mole weight (mol)
=89.73*98%*1=87.94 g;
$m_{2-3}$=molecular weight of sodium alginate-grafted polycaprolactone copolymer (g/mol)*sodium alginate-grafted polycaprolactone copolymer content (%)*mole weight (mol)
=164.52*2%*1=3.29 g;
The PP-TIE to which the sodium alginate-grafted polycaprolactone copolymer is added is set to be 1 mol, the mass of the PP-TIE is $m_{1-4}$ and the mass of the sodium alginate-grafted polycaprolactone copolymer is $m_{2-4}$;
$m_{1-4}$=molecular weight of PP-TIE (g/mol)*PP-TIE content (%)*mole weight (mol)
=45.56*98%*1=44.65 g;
$m_{2-4}$=molecular weight of sodium alginate-grafted polycaprolactone copolymer (g/mol)*sodium alginate-grafted polycaprolactone copolymer content (%)*mole weight (mol)
=164.52*2%*1=3.29 g;
The PP to which the sodium alginate-grafted polycaprolactone copolymer is added is set to be 1 mol, the mass of the PP is $m_{1-5}$ and the mass of the sodium alginate-grafted polycaprolactone copolymer is $m_{2-5}$;
$m_{1-5}$=molecular weight of PP (g/mol)*PP content (%)*mole weight (mol)
=41.07*98%*1=40.25 g;
$m_{2-5}$=molecular weight of sodium alginate-grafted polycaprolactone copolymer (g/mol)*sodium alginate-grafted polycaprolactone copolymer content (%)*mole weight (mol)
=164.52*2%*1=3.29 g;
By taking the outer layer PET as an example, the mass percent of the added sodium alginate-grafted polycaprolactone copolymer accounting for the mass of the PET is 3.29/(188.33+3.29)*100%=1.72%; and the mass percent of the added sodium alginate-grafted polycaprolactone copolymer in the materials of various layers is calculated in the same manner;
A ratio of the additive mass percents of the sodium alginate-grafted polycaprolactone copolymer of PET/EAA-TIE/EVOH/PP-TIE/PP from left to right is 1.72/8.24/3.61/6.86/7.56.

When the additive amount of the sodium alginate-grafted polycaprolactone copolymer accounting for the total mass of the material of the corresponding layer is in a range of 0.3-15%, there is no influence on the mechanical properties and barrier performance of the material of such layer B. Copolymer Copolymerized by Polylactic Acid (PLA) and Sodium Alginate 1. A monomer molecular formula of the sodium alginate is known as $[H—(OCH(CH3)CO)_2—OH]_m$, and a monomer molecular formula of the polycaprolactone is known as $[CH_2—(CH_2)_4—COO]_m$. A monomer molecular formula of sodium alginate-grafted polylactic acid copolymer 5-20 wt % with a grafting ratio being 5-20 wt % of is $[H—(OCH(CH3)CO)_2—OH]_m[C_5H_7O_4COONa]_n$. It can be known from the monomer molecular formula that the hydrophilic groups contained in the sodium alginate are carboxylic sodium (—COONa), hydroxyl (—OH) and ester group (—COOR), the hydrophilic groups contained in the polylactic acid are carboxyl (—COOH), hydroxyl (—OH) and ester group (—COOR), wherein the hydrophilic activity of the carboxylic sodium (—COONa) is larger than that of the carboxyl (—COOH), the hydrophilic activity of the carboxylic sodium (—COONa) in sodium alginate is larger than that of the carboxyl (—COOH) in the maleic anhydride-grafted ethylene acrylic copolymer EAA-TIE (95% EAA+5% maleic anhydride), the content of the carboxyl (—COOH) in the polylactic acid is larger than that of the carboxyl (—COOH) in the maleic anhydride-grafted ethylene acrylic copolymer EAA-TIE (95% EAA+5% maleic anhydride), the hydrophilic activity of the carboxyl (—COOH) in the polylactic acid is larger than that of the anhydride(—OC—O—CO—) in the maleic anhydride-grafted ethylene acrylic copolymer EAA-TIE (95% EAA+5% maleic anhydride). In the present embodiment, the sodium alginate-grafted polylactic acid copolymer with a grafting ratio being 10 mass % is selected as the active agent to be added to the materials of various layers.

2. Since the hydrophilic activity of the carboxylic sodium in the sodium alginate-grafted polylactic acid copolymer is larger than that of the carboxyl (—COOH) in the maleic anhydride-grafted ethylene acrylic copolymer EAA-TIE (95% EAA+5% maleic anhydride) having the highest hydrophilic activity in the composite film material, the content of the carboxyl (—COOH) in the sodium alginate-grafted polylactic acid copolymer is larger than that of the carboxyl (—COOH) in the maleic anhydride-grafted ethylene acrylic copolymer EAA-TIE (95% EAA+5% maleic anhydride), the copolymer plays a main role in a biodegradation process, while the action of the hydrophilic activity of the carboxyl (—COOH) in the maleic anhydride-grafted ethylene acrylic copolymer EAA-TIE (95% EAA+5% maleic anhydride), that of the hydroxyl in EVOH, that of the anhydride in PP-TIE and that of the ester group in PET in the composite film material are weakened. For simplifying expression, it is assumed in the following calculation that mole ratios of the hydrophilic groups to carbon atoms of the EAA-TIE, EVOH, PP-TIE and PET are 0.

3. A mole ratio of the hydrophilic groups to carbon atoms in the sodium alginate in the sodium alginate-grafted polylactic acid copolymer is 2/3; a mole ratio of the hydrophilic groups to carbon atoms in the polylactic acid is 2/3; through calculation, it can be obtained that a mole ratio of the hydrophilic groups to the carbon atoms in sodium alginate-grafted polylactic acid copolymer is 2/3*10%+2/3*90%=2/3.

4. The mole ratios of the hydrophilic groups to the carbon atoms in EAA-TIE, EVOH, PP-TIE, PET and PP are 0.

5. Since an additive amount of the additive master batch is less and the carrier in the additive master batch is the same as or similar to the added polymer, the mass of the carrier in the additive maser batch in the following calculation is omitted in order to simplify expression.

Mass percents of the sodium alginate-grafted polylactic acid copolymer added to the materials of various layers are respectively calculated by taking 1.5 mol % of sodium alginate-grafted polylactic acid copolymer additive amount as a reference value.

The materials of various layers in formula (1) and the sodium alginate-grafted polylactic acid copolymer are respectively mixed at a mole ratio of 98.5:1.5, and a mole ratio of the hydrophilic groups to the carbon atoms after the sodium alginate-grafted polylactic acid copolymer is added to the materials of various layers is calculated:

98.5/100*polyester$_{(n\ hydrophilic\ groups:n\ carbon\ atoms)}$+1.5/100*sodium alginate-grafted polylactic acid copolymer$_{(n\ hydrophilic\ groups:n\ carbon\ atoms)}$=98.5/100*0+1.5/100*2/3=0.0010;

98.5/100*maleic anhydride-grafted ethylene acrylic copolymer$_{(n\ hydrophilic\ groups:n\ carbon\ atoms)}$+1.5/100*sodium alginate-grafted polylactic acid copolymer$_{(n\ hydrophilic\ groups:n\ carbon\ atoms)}$=98.5/100*0+1.5/100*2/3=0.0010;

98.5/100*ethylene-vinyl alcohol copolymer$_{(n\ hydrophilic\ groups:n\ carbon\ atoms)}$+1.5/100*sodium alginate-grafted polylactic acid copolymer$_{(n\ hydrophilic\ groups:n\ carbon\ atoms)}$=98.5/100*0+1.5/100*2/3=0.0010;

98.5/100*maleic anhydride-grafted polypropylene copolymer$_{(n\ hydrophilic\ groups:n\ carbon\ atoms)}$+1.5/100*sodium alginate-grafted polylactic acid copolymer$_{(n\ hydrophilic\ groups:n\ carbon\ atoms)}$=98.5/100*0+1.5/100*2/3=0.0010;

98.5/100*polypropylene$_{(n\ hydrophilic\ groups:n\ carbon\ atoms)}$+1.5/100*sodium alginate-grafted polylactic acid copolymer$_{(n\ hydrophilic\ groups:n\ carbon\ atoms)}$=98.5/100*0+1.5/100*2/3=0.0010;

It can be obtained from above calculation that in the PET/EAA-TIE/EVOH/PP-TIE/PP structure, the materials of various layers and the sodium alginate-grafted polylactic acid copolymer are respectively mixed at a mole ratio of 98.5:1.5, the mole ratios of the hydrophilic groups to the carbon atoms after mixing are calculated to be the same, that is, the hydrophilic activities of the materials of various layers tend to be consistent, and degradation rates tend to be consistent. An additive mass of the sodium alginate-grafted polylactic acid copolymer in the materials of various layers is calculated as follows:

The PET to which the sodium alginate-grafted polylactic acid copolymer is added is set to be 1 mol, the mass of the PET is $m_{1-1}$ and the mass of the sodium alginate-grafted polylactic acid copolymer is $m_{2-1}$;

$m_{1-1}$=molecular weight of PET (g/mol)*PET content (%)*mole weight (mol)
=192.17*98.5%*1=189.29 g;

$m_{2-1}$=molecular weight of sodium alginate-grafted polylactic acid copolymer (g/mol)*sodium alginate-grafted polylactic acid copolymer content (%)*mole weight (mol)
=165.74*1.5%*1=2.49 g;

The EAA-TIE to which the sodium alginate-grafted polylactic acid copolymer is added is set to be 1 mol, the mass of the EAA-TIE is $m_{1-2}$, and the mass of the sodium alginate-grafted polylactic acid copolymer is $m_{2-2}$;

$m_{1-2}$=molecular weight of EAA-TIE (g/mol)*EAA-TIE content (%)*mole weight (mol)
=37.41*98.5%*1=36.85 g;

$m_{2-2}$=molecular weight of sodium alginate-grafted polylactic acid copolymer (g/mol)*sodium alginate-grafted polylactic acid copolymer content (%)*mole weight (mol)
=165.74*1.5%*1=2.49 g;

The EVOH to which the sodium alginate-grafted polylactic acid copolymer is added is set to be 1 mol, the mass of the EVOH is $m_{1-3}$ and the mass of the sodium alginate-grafted polylactic acid copolymer is $m_{2-3}$;

$m_{1-3}$=molecular weight of EVOH (g/mol)*EVOH content (%)*mole weight (mol)
=89.73*98.5%*1=88.38 g;

$m_{2-3}$=molecular weight of sodium alginate-grafted polylactic acid copolymer (g/mol)*sodium alginate-grafted polylactic acid copolymer content (%)*mole weight (mol)
=165.74*1.5%*1=2.49 g;

The PP-TIE to which the sodium alginate-grafted polylactic acid copolymer is added is set to be 1 mol, the mass of the PP-TIE is $m_{1-4}$ and the mass of the sodium alginate-grafted polylactic acid copolymer is $m_{2-4}$;

$m_{1-4}$=molecular weight of PP-TIE (g/mol)*PP-TIE content (%)*mole weight (mol)
=45.56*98.5%*1=44.88 g;

$m_{2-4}$=molecular weight of sodium alginate-grafted polylactic acid copolymer (g/mol)*sodium alginate-grafted polylactic acid copolymer content (%)*mole weight (mol)
=165.74*1.5%*1=2.49 g;

The PP to which the sodium alginate-grafted polylactic acid copolymer is added is set to be 1 mol, the mass of the PP is $m_{1-5}$ and the mass of the sodium alginate-grafted polylactic acid copolymer is $m_{2-5}$;

$m_{1-5}$=molecular weight of PP (g/mol)*PP content (%)*mole weight (mol)
=41.07*98.5%*1=40.45 g;

$m_{2-5}$=molecular weight of sodium alginate-grafted polylactic acid copolymer (g/mol)*sodium alginate-grafted polylactic acid copolymer content (%)*mole weight (mol)
=165.74*1.5%*1=2.49 g;

By taking the outer layer PET as an example, the mass percent of the added sodium alginate-grafted polylactic acid copolymer accounting for the mass of the PET is 2.49/(189.29+2.49)*100%=1.30%; and the mass percent of the added sodium alginate-grafted polylactic acid copolymer in the materials of various layers is calculated in the same manner;

A ratio of the additive mass percents of the sodium alginate-grafted polylactic acid copolymer of PET/EAA-TIE/EVOH/PP-TIE/PP from left to right is 1.30/6.33/2.74/5.26/5.80.

When the additive amount of the sodium alginate-grafted polylactic acid copolymer accounting for the total mass of the material of the corresponding layer is in a range of 0.3-15%, there is no influence on the mechanical properties and barrier performance of the material of such layer In the embodiments above, the sodium alginate and sodium alginate-grafted copolymers are selected as the active agent, which are directly supported by the embodiments above; however, in the present invention, except for the active agents as shown in the above, other polymers, such as polycaprolactone, polylactic acid, polycaprolactone polyhydric alcohols, polysaccharide polymer, algae group polymer, etc., which contain the hydrophilic groups: carboxylate, carboxyl, hydroxyl, aldehyde group, acylamino, anhydride and ester group and the like can also be selected, and those skilled in the art can understand and predict specific polymers containing these groups under the inspiration of the embodiments of the present invention; therefore, the additive master batch according to the present invention is not limited to these polymers given in the embodiments.

In the embodiments above, some examples about values of the additive amount of the additive master batch are given, and under the inspiration of the examples, those skilled in the art can easily conceive that the objective and effect of the present can be realized if the additive master batch is in a range of 0.3-15%.

In the above embodiments, in order to facilitate implementation (suitable for melting extrusion), a range is set for a density, a copolymerization proportion and a blending proportion of the materials of various layers and is explained in the examples. However these requirements are not necessary for the present invention, and cannot serve as a basis limiting a protection scope of the present invention, in other words, various indexes suitable for the melting extrusion outside the range above can be used for implementing the present invention and obtaining corresponding technical effects.

In the present invention, structural formulas of the composite film are given, but in the structural formulas, the same material in the same position can be combined by one or multiple layers, for example, in the structural formula PET/EAA-TIE/EVOH/PE-TIE/PE; such structural formula expresses a 5-layer structure seemingly, but the material in any position can be combined by two or more layers, for example, PE can be combined by two layers such that the composite film is combined by 6 layers, and so on.

The embodiments above are merely intended to explain a technical concept and characteristics of the present invention, aim to cause those skilled in the art to learn about and accordingly implement content of the present invention, and cannot limit the protective scope of the present invention. All equivalent changes or modifications made according to a spiritual essence of the present invention should fall within the protective scope of the present invention.

What is claimed is:

1. A degradable EVOH high-barrier composite film with a structure as follows:

PET/EAA-TIE/EVOH/PE-TIE/PE  Formula (1)

in formula (1), the meanings in a sequence from left to right are as follows:

PET is an outer layer which has a function of a protective layer or presentation layer, a material of the PET is a polyethylene terephthalate, and a hydrophilic group that the polyethylene terephthalate contains is ester group;

EAA-TIE is a first adhesive layer, a material of the EAA-TIE is maleic anhydride-grafted ethylene acrylic copolymer, and hydrophilic groups that the maleic anhydride-grafted ethylene acrylic copolymer contains are carboxyl and anhydride;

EVOH is an intermediate layer which has a function of a barrier layer, a material of the EVOH comprises ethylene-vinyl alcohol copolymer, and a hydrophilic group that the ethylene-vinyl alcohol copolymer contains is hydroxyl;

PE-TIE is a second adhesive layer, a material of the PE-TIE is maleic anhydride-grafted polyethylene copolymer, and a hydrophilic group that the maleic anhydride-grafted polyethylene copolymer PE-TIE layer contains is anhydride;

PE is an inner layer which has a function of a heat sealing layer, and a material of the PE is polyethylene which does not contain a hydrophilic group, characterized in that the layers in the composite film each have added thereto biomass comprising an additive master batch for the respective layer having biodegradable activity under a condition of a refuse disposal plant or composting;

the additive master batch comprises a carrier and an active agent, the active agent is a polymer containing a hydrophilic group, wherein an effective component of the active agent is the hydrophilic group, and the hydrophilic group is at least one of carboxylate, carboxyl, hydroxyl, aldehyde group, acylamino, anhydride and ester group;

for the polyethylene terephthalate material of the outer layer, the carrier in the additive master batch is polyester;

for the maleic anhydride-grafted ethylene acrylic copolymer material of the first adhesive layer, the carrier in the additive master batch is ethylene acrylic copolymer;

for the ethylene-vinyl alcohol copolymer material of the intermediate layer, the carrier in the additive master batch is polyethylene;

for the maleic anhydride-grafted polyethylene copolymer material of the second adhesive layer, the carrier in the additive master batch is polyethylene;

for the polyethylene material of the inner layer, the carrier in the additive master batch is polyethylene;

wherein the additive amount of the additive master batch in the materials of each layer is controlled within the range of 0.3-15% of the total mass of the materials of the corresponding layer; wherein the hydrophilic activity of the hydrophilic groups in the polymer of the additive master batch for each layer is greater than or equal to the hydrophilic activity of said hydrophilic groups in the materials of each respective layer in formula (1);

wherein the mole ratio of the hydrophilic groups to carbon atoms within each layer is the same across all layers in formula (1) by the additive amount of the additive master batch for each layer.

2. A degradable EVOH high-barrier composite film with a structure as follows:

PET/EAA-TIE/EVOH/PP-TIE/PP Formula (2) in formula (2), the meanings in a sequence from left to right are as follows:

PET is an outer layer which has a function of a protective layer or presentation layer, a material of the PET is a polyethylene terephthalate, and a hydrophilic group that the polyethylene terephthalate contains is ester group;

EAA-TIE is a first adhesive layer, a material of the EAA-TIE is maleic anhydride-grafted ethylene acrylic copolymer, and hydrophilic groups that the maleic anhydride-grafted ethylene acrylic copolymer contains are carboxyl and anhydride;

EVOH is an intermediate layer which has a function of a barrier layer, a material of the EVOH is ethylene-vinyl alcohol copolymer, and a hydrophilic group that the ethylene-vinyl alcohol copolymer contains is hydroxyl;

PP-TIE is a second adhesive layer, a material of the PP-TIE is maleic anhydride-grafted polypropylene copolymer, and a hydrophilic group that the maleic anhydride-grafted polypropylene copolymer contains is anhydride;

PP is an inner layer which has a function of a heat sealing layer, and a material of the PP is polypropylene which does not contain a hydrophilic group, characterized in that the layers in the composite film each have added thereto biomass comprising an additive master batch for the respective layer having biodegradable activity under a condition of a refuse disposal plant or composting;

the additive master batch comprises a carrier and an active agent, the active agent is a polymer containing a hydrophilic group, wherein an effective component of the active agent is the hydrophilic group, and the hydrophilic group is at least one of carboxylate, carboxyl, hydroxyl, aldehyde group, acylamino, anhydride and ester group;

for the polyethylene terephthalate material of the outer layer, the carrier in the additive master batch is polyester;

for the maleic anhydride-grafted ethylene acrylic copolymer material of the first adhesive layer, the carrier in the additive master batch is ethylene acrylic copolymer;

for the ethylene-vinyl alcohol copolymer material of the intermediate layer, the carrier in the additive master batch is polyethylene;

for the maleic anhydride-grafted polypropylene copolymer material of the second adhesive layer, the carrier in the additive master batch is at least one of polypropylene and polyethylene;

for the polypropylene material of the inner layer, the carrier in the additive master batch is polypropylene;

wherein the additive amount of the additive master batch in the materials of each layer is controlled within the range of 0.3-15% of the total mass of the materials of the corresponding layer; wherein the hydrophilic activity of the hydrophilic groups in the polymer of the additive master batch for each layer is greater than or equal to the hydrophilic activity of said hydrophilic groups in the materials of each respective layer in formula (2);

wherein the mole ratio of the hydrophilic groups to carbon atoms within each layer is the same across all layers in formula (2) by the additive amount of the additive master batch for each layer.

3. The degradable EVOH high-barrier composite film according to claim 1 or 2, characterized in that in the outer layer, the polyethylene terephthalate is amorphous polyethylene terephthalate or poly(ethylene terephthalateco-1,4-cylclohexylenedimethylene terephthalate), and the density of the polyethylene terephthalate is 1.300-1.400 g/cm$^3$.

4. The degradable EVOH high-barrier composite film according to claim 1 or 2, characterized in that in the first adhesive layer, the density of the maleic anhydride-grafted ethylene acrylic copolymer is 0.920-0.940 g/cm$^3$, the mass percent of the grafting ratio of maleic anhydride is 0.3-10%; and the mole content of acrylic acid in the ethylene acrylic copolymer is 8-28%.

5. The degradable EVOH high-barrier composite film according to claim 1 or 2, characterized in that in the intermediate layer which has a function of a barrier layer, the mole content of ethylene in the ethylene-vinyl alcohol copolymer is 26-48%, and the density is 1.170-1.190 g/cm$^3$.

6. The degradable EVOH high-barrier composite film according to claim 1, characterized in that in the second adhesive layer, the density of the maleic anhydride-grafted polyethylene copolymer is 0.910-0.950 g/cm$^3$, and the mass percent of the grafting ratio of maleic anhydride is 0.3-10%.

7. The degradable EVOH high-barrier composite film according to claim 1, characterized in that in the inner layer which has a function of a heat sealing layer, the polyethylene has the density of 0.900-0.935 g/cm$^3$ and contains a polyethylene copolymer, wherein the polyethylene copolymer has a density of 0.910-0.925 g/cm$^3$ and comprises 50-99 wt % of polyethylene and 1-50 wt % of vinyl homopolymer, or the polyethylene copolymer comprises 50-99 wt % of polyethylene and 1-50 wt % of vinyl copolymer, wherein the vinyl copolymer comprises ethylene and at least one of C4-C12 .alpha.-olefin, cycloolefin, vinyl arene and polar vinyl monomer, and the density of the vinyl copolymer is 0.880-0.915 g/cm$^3$.

8. The degradable EVOH high-barrier composite film according to claim 2, characterized in that in the second adhesive layer, the density of the maleic anhydride-grafted polypropylene copolymer is 0.880-0.910 g/cm$^3$, and the mass percent of a grafting ratio of maleic anhydride is 0.3-10%.

9. The degradable EVOH high-barrier composite film according to claim 2, characterized in that the inner layer which has a function of a heat sealing layer comprises polypropylene, the polypropylene comprises isotactic polypropylene homopolymer or/and polypropylene random copolymer, and the density of the polypropylene is 0.880-0.910 g/cm$^3$.

* * * * *